United States Patent
Reichling

(10) Patent No.: US 10,326,822 B2
(45) Date of Patent: Jun. 18, 2019

(54) METHODS, SYSTEMS AND MEDIA FOR PRESENTING A VIRTUAL OPERATING SYSTEM ON A DISPLAY DEVICE

(71) Applicant: Google LLC, Mountain View, CA (US)

(72) Inventor: Stewart Reichling, Atlanta, GA (US)

(73) Assignee: Google LLC, Mountain View, CA (US)

(*) Notice: Subject to any disclaimer, the term of this patent is extended or adjusted under 35 U.S.C. 154(b) by 405 days.

(21) Appl. No.: 14/958,640

(22) Filed: Dec. 3, 2015

(65) Prior Publication Data
US 2017/0244779 A1 Aug. 24, 2017

(51) Int. Cl.
| | |
|---|---|
| H04L 29/08 | (2006.01) |
| G06F 3/0482 | (2013.01) |
| G06F 3/0484 | (2013.01) |
| H04L 29/06 | (2006.01) |
| H04N 21/41 | (2011.01) |
| H04N 21/414 | (2011.01) |
| H04N 21/422 | (2011.01) |
| H04N 21/482 | (2011.01) |
| G06F 9/451 | (2018.01) |

(52) U.S. Cl.
CPC .......... *H04L 67/025* (2013.01); *G06F 3/0482* (2013.01); *G06F 3/04842* (2013.01); *G06F 9/451* (2018.02); *G06F 9/452* (2018.02); *H04L 65/60* (2013.01); *H04N 21/4122* (2013.01); *H04N 21/41407* (2013.01); *H04N 21/42204* (2013.01); *H04N 21/482* (2013.01)

(58) Field of Classification Search
CPC .............................. G06F 3/0482; G06F 3/0484
See application file for complete search history.

(56) References Cited

U.S. PATENT DOCUMENTS

| | | | |
|---|---|---|---|
| 8,434,108 | B2 | 4/2013 | Tsai |
| 2011/0074794 | A1* | 3/2011 | Felt ..................... H04N 21/4122 345/520 |
| 2012/0081353 | A1 | 4/2012 | Yusupov et al. |
| 2012/0173979 | A1 | 7/2012 | Lee |

(Continued)

OTHER PUBLICATIONS

International Search Report and Written Opinion dated Mar. 24, 2017 in International Patent Application No. PCT/US2016/064147.

(Continued)

*Primary Examiner* — David E Choi
(74) *Attorney, Agent, or Firm* — Byrne Poh LLP

(57) ABSTRACT

Methods, systems, and media for presenting a virtual operating system on a display device are provided. In some implementations, a method for presenting a virtual operating system user interface (Virtual OS UI) is provided, the method comprising: receiving a request to provide the virtual OS UI for a display coupled to a media receiving device; selecting applications; generating the virtual OS UI including the applications; causing the media receiving device to present the virtual OS UI on the display; receiving signals from a remote control to select a second application; executing the second application; causing the media receiving device to present the second application on the display; receiving signals from the remote control to select media content; causing the media receiving device to request the selected media content; and causing the media receiving device to present the requested media content using the display.

18 Claims, 33 Drawing Sheets

(56) References Cited

U.S. PATENT DOCUMENTS

| | | | |
|---|---|---|---|
| 2012/0282914 A1 | 11/2012 | Lael | |
| 2014/0040826 A1* | 2/2014 | Wei | G06F 3/0488 |
| | | | 715/810 |
| 2014/0359477 A1* | 12/2014 | Chen | H04L 67/1095 |
| | | | 715/748 |
| 2014/0362293 A1 | 12/2014 | Bakar et al. | |
| 2015/0082184 A1* | 3/2015 | Kim | H04L 67/10 |
| | | | 715/740 |
| 2015/0309669 A1 | 10/2015 | Wheeler et al. | |
| 2017/0244779 A1* | 8/2017 | Reichling | G06F 3/0482 |

OTHER PUBLICATIONS

Turner, A., "Hands on: Chromecast Android Screen Mirroring", In Digital Life, Jul. 2014, pp. 1-3, available ast http://www.smh.com.au/digital-life/computer/gadgets-on-the-go/hands-on/chromsecast-android-screen-mirroring-20140713-zt68u.html.

International Preliminary Report on Patentability dated Jun. 5, 2018 in International Patent Application No. PCT/US2016/064147.

* cited by examiner

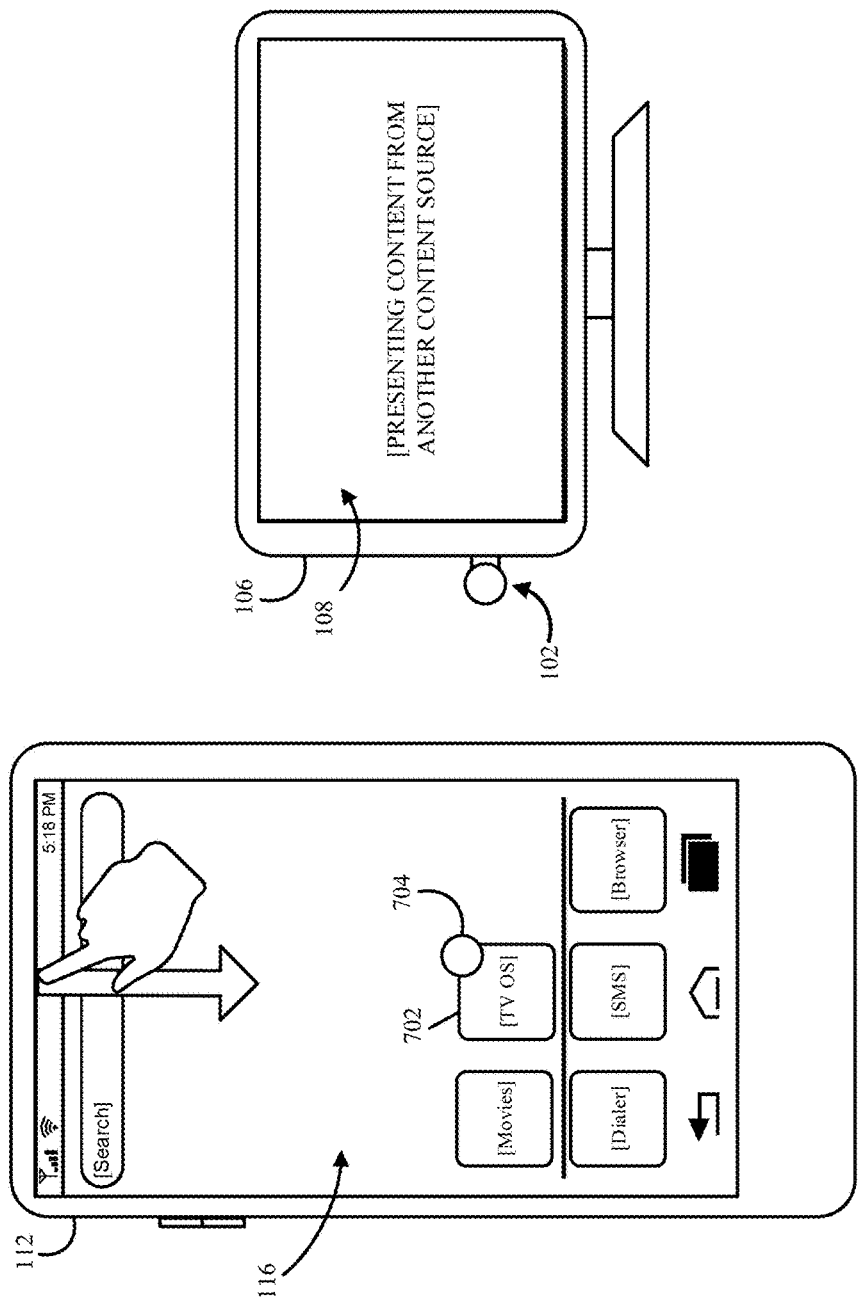

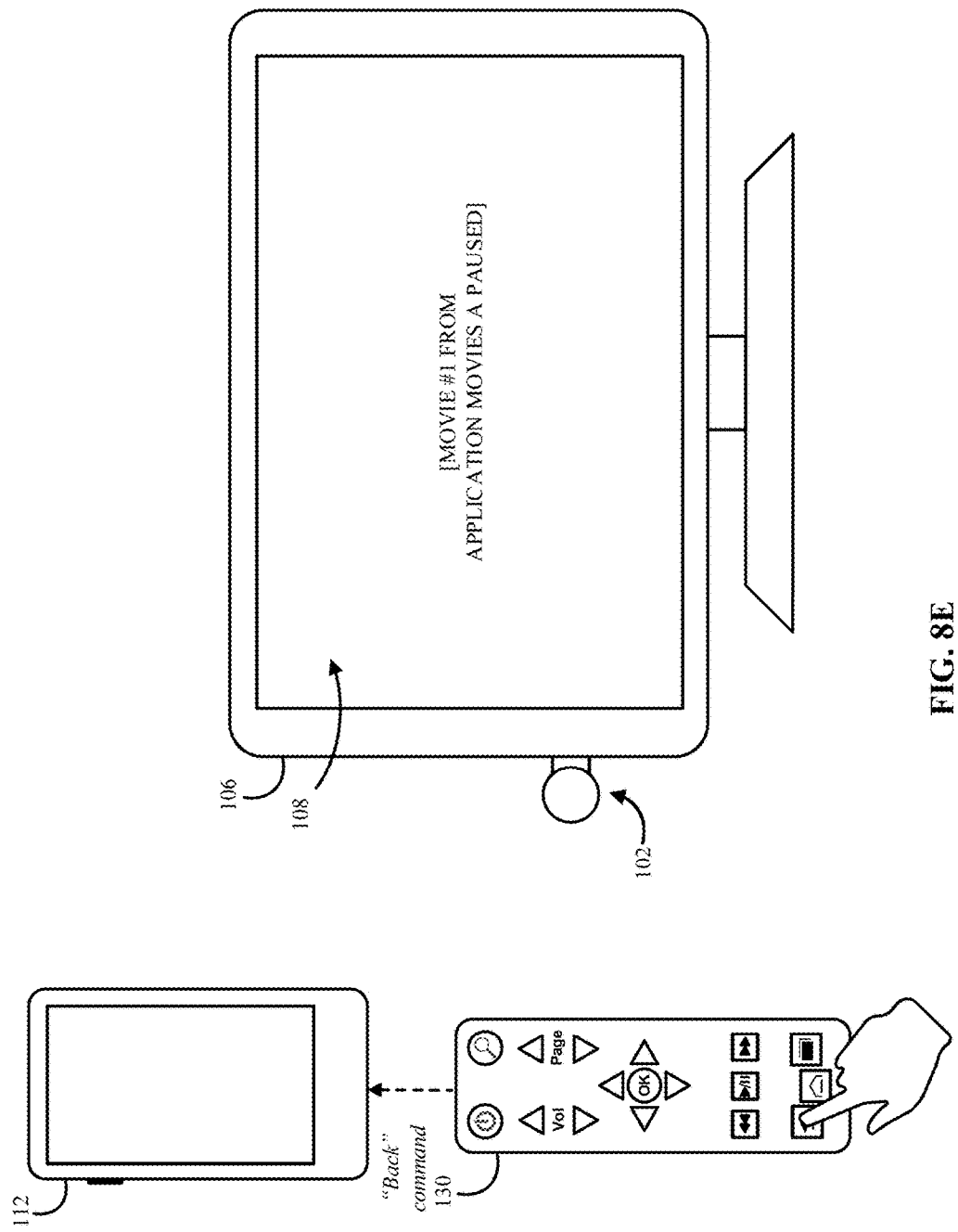

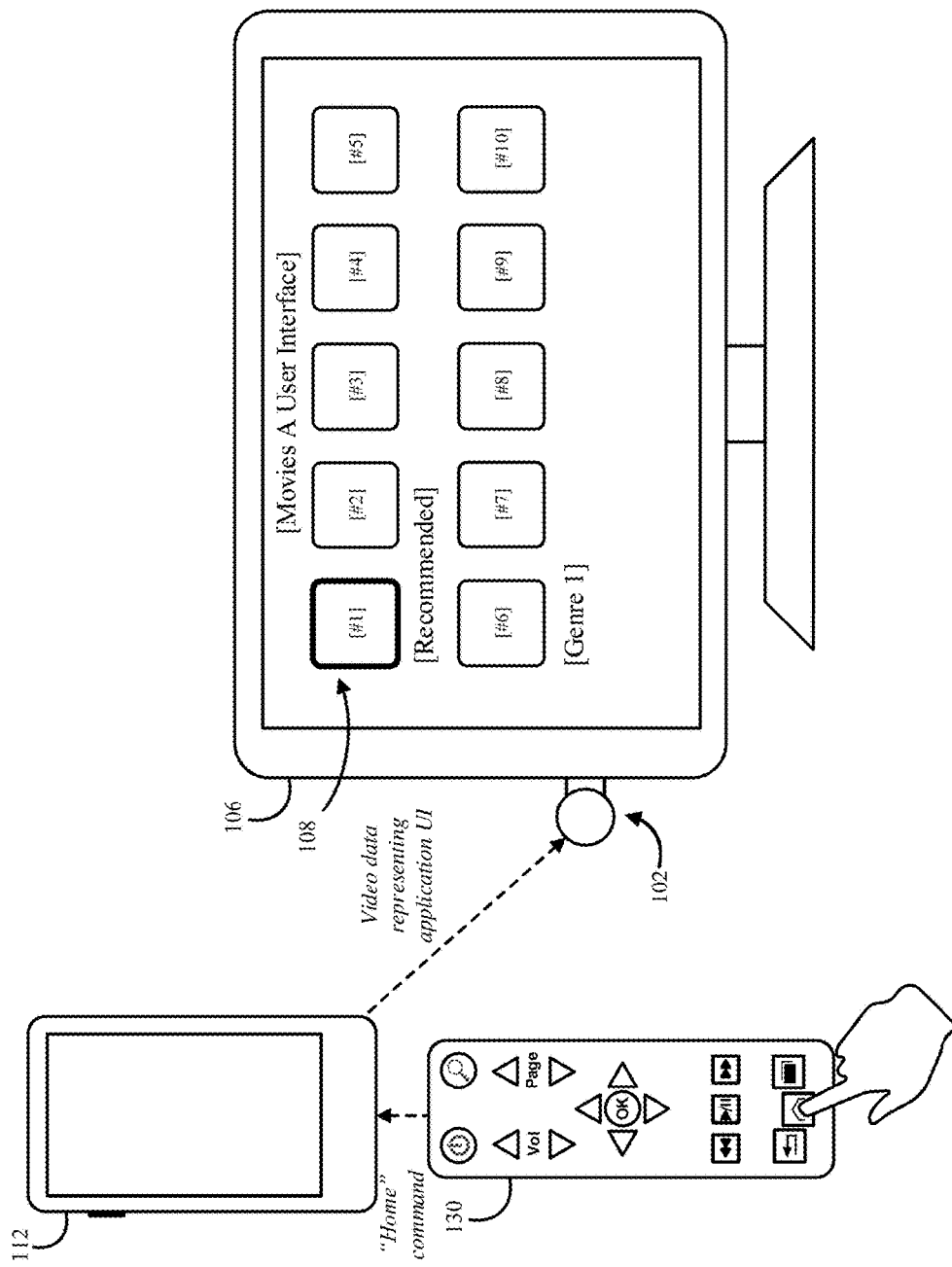

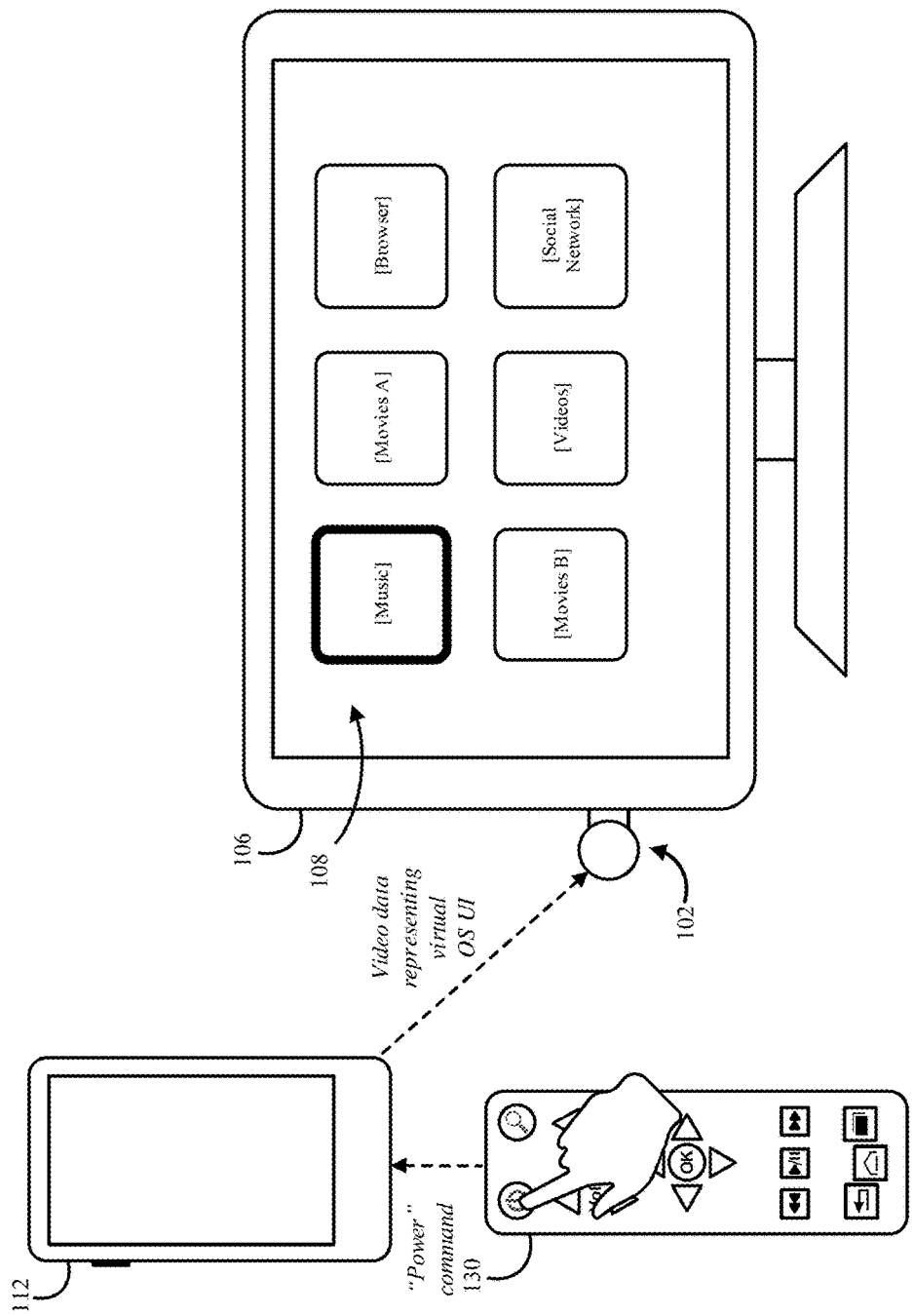

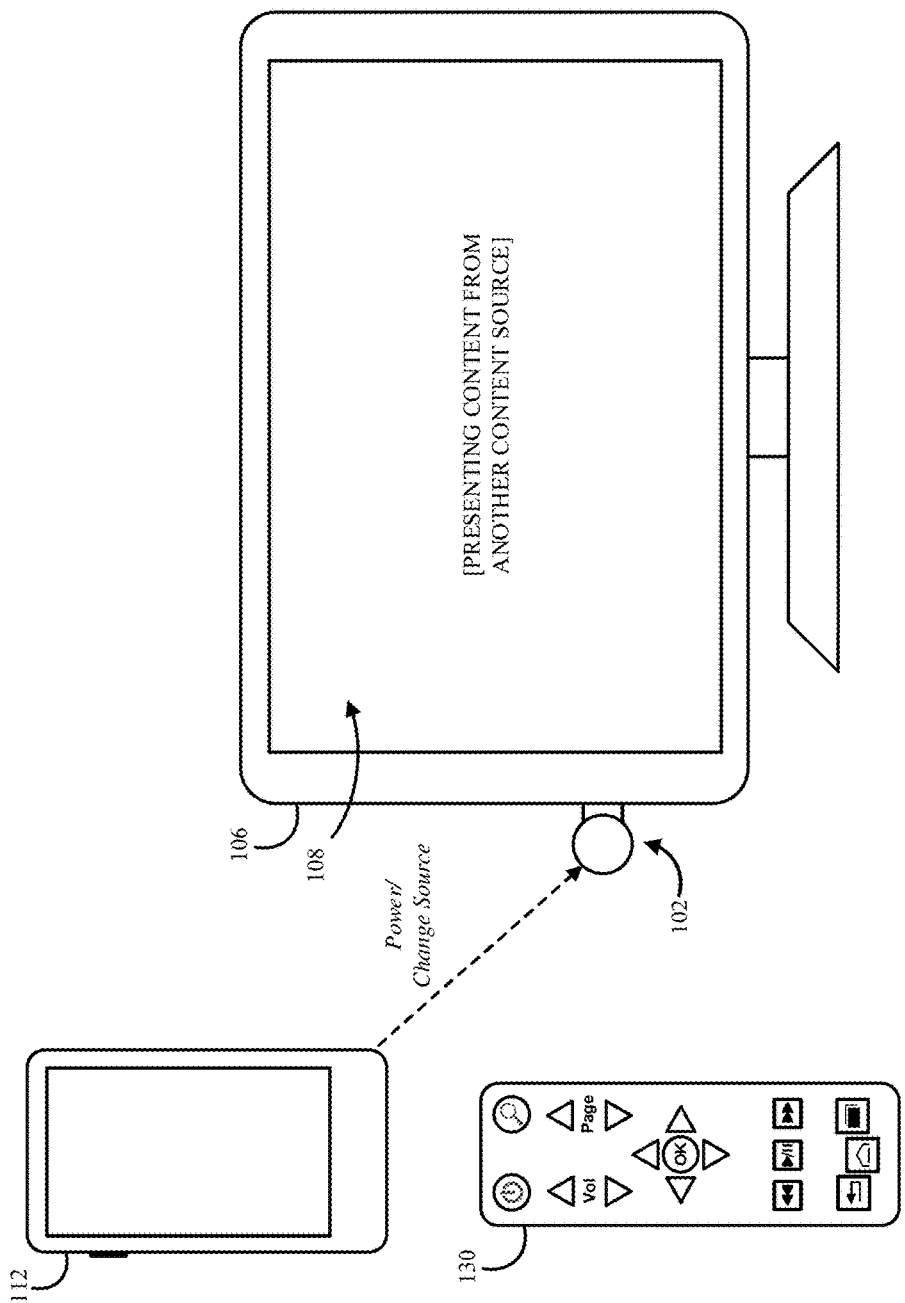

METHODS, SYSTEMS AND MEDIA FOR PRESENTING A VIRTUAL OPERATING SYSTEM ON A DISPLAY DEVICE

TECHNICAL FIELD

Methods, systems and media for presenting a virtual operating system on a display device are provided.

BACKGROUND

Digital media receivers and smart televisions installed with full operating systems can execute applications that allow a user to select media content to be presented and to present the selected media content. However, such digital media receivers are often relatively expensive compared to devices that do not have a full operating system. Similarly, the hardware required for executing a full operating system and/or applications can add a significant cost to a new television.

Low cost digital media receivers are available that do not execute a full operating system. Rather, such devices typically stream media content from a media content source, but require a mobile device or a personal computer to select the media content to be streamed.

Accordingly, methods, systems and media for presenting a virtual operating system on a display device are desirable.

SUMMARY

In accordance with some implementations of the disclosed subject matter, mechanisms for presenting a virtual operating system on a display device are provided.

In accordance with some implementations of the disclosed subject matter, a method for presenting a virtual operating system user interface is provided, the method comprising: receiving, using a hardware processor of a mobile device, a request to provide the virtual operating system user interface for a display device operatively coupled to a media receiving device; selecting a plurality of applications to present in the virtual operating system user interface; generating, using the hardware processor of the mobile device, the virtual operating system user interface to include user interface elements corresponding to at least one of the plurality of applications; causing, using the hardware processor of the mobile device, the media receiving device to present the virtual operating system user interface on the display device; causing, using the hardware processor of the mobile device, a first user interface element corresponding to a first application of the plurality of applications to be highlighted in the virtual operating system user interface; receiving, using the hardware processor of the mobile device, one or more signals from a remote control device to select a second user interface element corresponding to a second application of the plurality of applications; executing, using the hardware processor of the mobile device, the second application to generate an application user interface for the second application to be presented by the display device; causing, using the hardware processor of the mobile device, the media receiving device to present the application user interface for the second application on the display device; receiving, using the hardware processor of the mobile device, one or more signals from the remote control device to select a user interface element of the second application corresponding to a media content item; causing, using the hardware processor of the mobile device, the media receiving device to request the selected media content item from a remote server associated with the second application; and causing, using the hardware processor of the mobile device, the media receiving device to present the requested media content item using the display device.

In accordance with some implementations of the disclosed subject matter, a system for presenting a virtual operating system user interface is provided, the system comprising: a mobile device comprising a hardware processor that is programmed to: receive a request to provide the virtual operating system user interface for a display device operatively coupled to a media receiving device; select a plurality of applications to present in the virtual operating system user interface; generate the virtual operating system user interface to include user interface elements corresponding to at least one of the plurality of applications; cause the media receiving device to present the virtual operating system user interface on the display device; cause a first user interface element corresponding to a first application of the plurality of applications to be highlighted in the virtual operating system user interface; receive one or more signals from a remote control device to select a second user interface element corresponding to a second application of the plurality of applications; execute the second application to generate an application user interface for the second application to be presented by the display device; cause the media receiving device to present the application user interface for the second application on the display device; receive one or more signals from the remote control device to select a user interface element of the second application corresponding to a media content item; cause the media receiving device to request the selected media content item from a remote server associated with the second application; and cause the media receiving device to present the requested media content item using the display device.

In accordance with some implementations of the disclosed subject matter, a non-transitory computer-readable medium containing computer executable instructions that, when executed by a processor, cause the processor to perform a method for presenting a virtual operating system user interface is provided, the method comprising: receiving, at a mobile device, a request to provide the virtual operating system user interface for a display device operatively coupled to a media receiving device; selecting a plurality of applications to present in the virtual operating system user interface; generating, by the mobile device, the virtual operating system user interface to include user interface elements corresponding to at least one of the plurality of applications; causing, by the mobile device, the media receiving device to present the virtual operating system user interface on the display device; causing, by the mobile device, a first user interface element corresponding to a first application of the plurality of applications to be highlighted in the virtual operating system user interface; receiving, by the mobile device, one or more signals from a remote control device to select a second user interface element corresponding to a second application of the plurality of applications; executing, by the mobile device, the second application to generate an application user interface for the second application to be presented by the display device; causing, by the mobile device, the media receiving device to present the application user interface for the second application on the display device; receiving, at the mobile device, one or more signals from the remote control device to select a user interface element of the second application corresponding to a media content item; causing, by the mobile device, the media receiving device to request the selected media content item from a remote server associated with the second application; and causing, by the mobile device, the media receiving device to present the requested media content item using the display device.

In accordance with some implementations of the disclosed subject matter, a system for presenting a virtual operating system user interface is provided, the system comprising: means for receiving a request to provide the virtual operating system user interface for a display device operatively coupled to a media receiving device; means for selecting a plurality of applications to present in the virtual operating system user interface; means for generating the virtual operating system user interface to include user interface elements corresponding to at least one of the plurality of applications; means for causing the media receiving device to present the virtual operating system user interface on the display device; means for causing a first user interface element corresponding to a first application of the plurality of applications to be highlighted in the virtual operating system user interface; means for receiving one or more signals from a remote control device to select a second user interface element corresponding to a second application of the plurality of applications; means for executing the second application to generate an application user interface for the second application to be presented by the display device; means for causing the media receiving device to present the application user interface for the second application on the display device; means for receiving one or more signals from the remote control device to select a user interface element of the second application corresponding to a media content item; causing the media receiving device to request the selected media content item from a remote server associated with the second application; and causing the media receiving device to present the requested media content item using the display device.

In some implementations, the application user interface is formatted for presentation on the display device, wherein the second application is associated with a service that provides access to one or more media content items and wherein the application user interface includes a plurality of user interface elements each corresponding to at least one of the one or more media content items.

In some implementations, the system further comprises: means for receiving a signal from the remote control device to pause presentation of the selected media content item; and means for causing the media receiving device to pause presentation of the selected media content item.

In some implementations, the system further comprises: means for receiving a signal from the remote control device to go back to a previous screen during presentation of the selected media content item; and means for causing the media receiving device to present the application user interface for the second application on the display device in response to receiving the signal to go back to a previous screen.

In some implementations, the system further comprises: means for receiving a signal from the remote control device to present a home screen during presentation of the selected media content item; and means for causing the media receiving device to present the virtual operating system user interface in response to receiving the signal to go to the home screen.

In some implementations, the means for causing the media receiving device to present the application user interface for the second application on the display device is operable with the mobile device in a display inhibited state.

In some implementations, at least a portion of the plurality of applications are selected from application installed on the mobile device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 7A-7C show an example of using the mechanisms described herein for causing a virtual operating system to be presented on a display device from one of the computing devices depicted in FIGS. 1 and 2 in accordance with some implementations of the disclosed subject matter.

FIGS. 8A-8H show an example of using the mechanisms described herein for presenting and navigating a virtual operating system on a display device using one of the computing devices and the remote control depicted in FIGS. 1 and 2 in accordance with some implementations of the disclosed subject matter.

DETAILED DESCRIPTION

Figure 1:
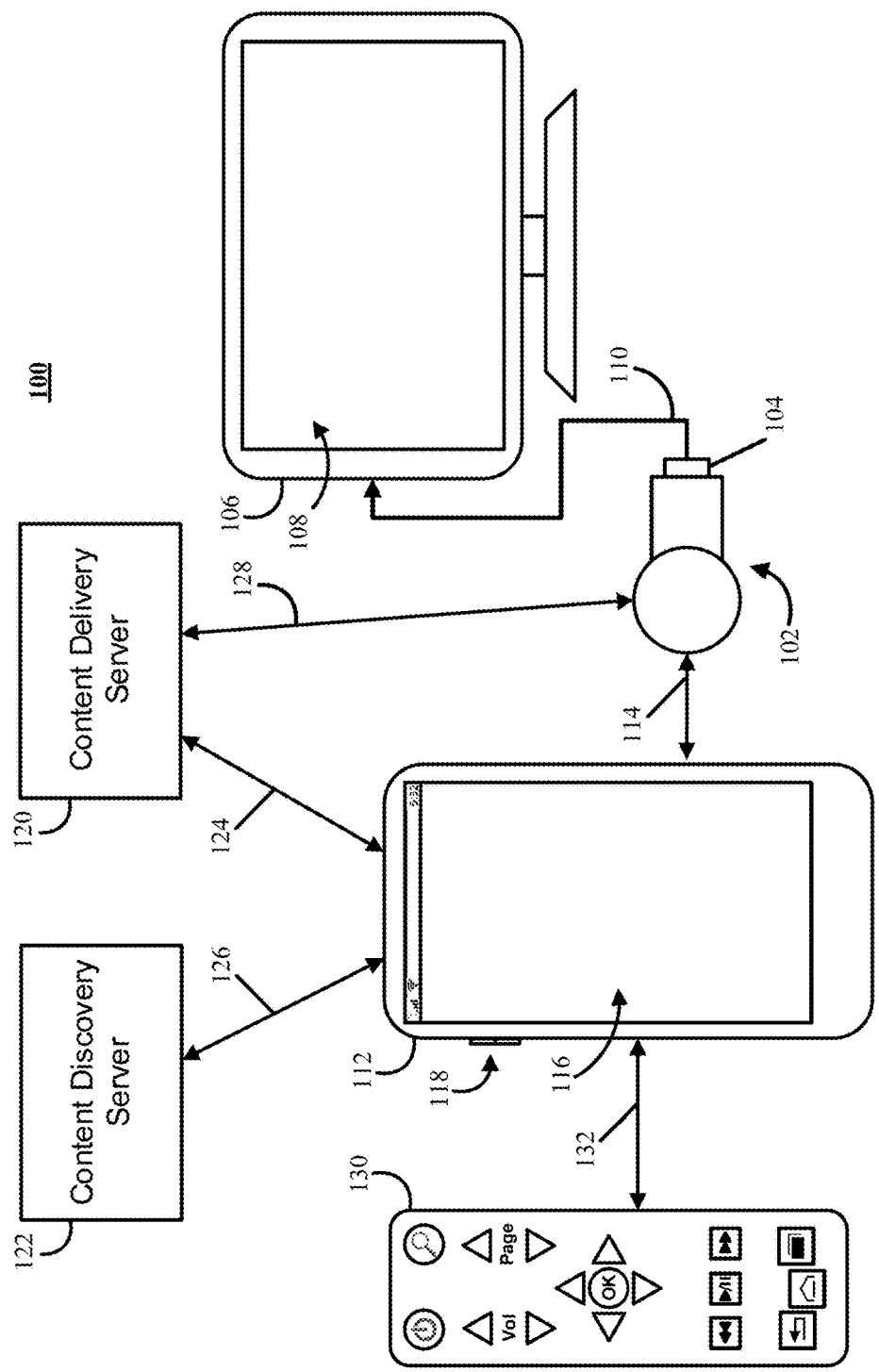
FIG. 1 shows an example of a system for presenting a virtual operating system on a display device in accordance with some implementations of the disclosed subject matter.

In accordance with some implementations of the disclosed subject matter, mechanisms (which can include methods, systems and media) for presenting a virtual operating system on a display device are provided.

In some implementations, the mechanisms described herein can facilitate interaction with a display device (e.g., a television, a vehicle entertainment system, a projector, etc.) using a virtual operating system user interface provided by a computing device (e.g., a smartphone, a tablet computer, or a personal computer, etc.), and presented on the display device. In some implementations, the computing device can generate the virtual operating system user interface to be presented on the display device. For example, a smartphone can generate a virtual operating system user interface to be presented on a television screen.

In some implementations, the computing device can populate the virtual operating system user interface with applications that can be executed by the computing device to access media content (e.g., videos, music, photos, etc.), which are compatible with the virtual operating system user interface and/or the display device. For example, the smartphone can determine which applications installed on the smartphone are compatible with the virtual operating system and/or with presentation on the television, and can cause icons for these applications to be presented in the virtual operating system user interface.

In some implementations, the computing device can stream the virtual operating system user interface to the display device and/or a media receiving device connected to the display device over a local area network. For example, the smartphone can stream the virtual operating system user interface as video over a local wireless network (e.g., a Wi-Fi network) to an HDMI dongle device that is configured to stream media content from the smartphone and/or a remote content server. In such an example, the HDMI dongle device can then output the streamed virtual operating system user interface to a television via one or more HDMI connections between the HDMI dongle device and the television.

In some implementations, the computing device can receive input to select an application, and can present an application user interface for the selected application. In such implementations, the computing device can receive further input to select media content available via the application, and can cause the display device and/or media receiving device to stream the selected media content. For example, the smartphone can receive input from a remote control to select an application presented in the virtual operating system user interface. In a more particular example, an application for browsing and/or viewing videos can be selected, and the smartphone can stream video of a user interface for the selected application to the HDMI dongle device for presentation on the television. In such a more particular example, the smartphone can receive input from the remote control to select a particular video, and the smartphone can subsequently cause the selected video to be streamed by the HDMI dongle device from a server associated with the application.

Turning to FIG. 1, an example 100 of a system for presenting a virtual operating system on a display device is shown in accordance with some implementations of the disclosed subject matter. In some implementations, system 100 can include a media receiving device 102, which can include an input/output connector 104. Input/output connector 104 can be any suitable input and/or output connector for communicating with a media playback device 106. For example, input/output connector 104 can be a High-Definition Multimedia Interface (HDMI) port, a Universal Serial Bus (USB) connector (e.g., a USB 3.0 connector), a THUNDERBOLT connector, a Digital Visual Interface (DVI) connector, a TOSLINK connector (e.g., a fiber optic audio connector), a Separate Video (S-Video) Connector, any other suitable connector and/or any suitable combination of connectors.

In some implementations, media playback device 106 can be a display device that includes hardware and/or software for presenting media received from one or more sources of media content. For example, media playback device 106 can include a television, a smart television, a monitor, a set-top box, an audio video (AV) receiver, any other suitable media playback device and/or any suitable combination thereof. More particularly, media playback device 106 can include a display 108, speakers, hardware and/or software for rendering media content such as analog and/or digital video and/or audio data, a power supply, etc. Media playback device 106 can include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In some implementations, media receiving device 102 can be connected to media playback device 106 by a connection 110. Media receiving device 102 and media playback device 106 can be connected using any suitable technique(s). For example, connection 110 can include a plug of input/output connector 104 of media receiving device 102 inserted in a corresponding receptacle port of media playback device 106. As another example, a suitable cable, such as an HDMI cable, can be connected between input/output connector 104 and a port of media playback device 106. Additionally or alternatively, media receiving device 102 can be included as hardware and/or software of media playback device 106.

In some implementations, media receiving device 102 can be coupled to a computing device 112 using a communications link 114. Computing device 112 can be any suitable computing device, such as a smartphone, a tablet computer, a wearable computer, a laptop computer, a personal computer, an electronic reader, a digital media receiver, a smart television, a game console, any other suitable computing device, or any suitable combination thereof. In some implementations, communications link 114 can include any suitable communications link, for example, as described below in connection with FIG. 2. Additionally, communications link 114 can include a network, such as a local area network (LAN) having wired and/or wireless connections. Additionally or alternatively, communications link 114 can include a wireless connection between computing device 112 and media receiving device 102, such as an ad hoc wireless network. In some implementations, communications between computing device 112 and media receiving device 102 over communications link 114 can be encrypted using any suitable encryption technique(s). For example, messages sent from computing device 112 to media receiving device 114 can be encrypted using any suitable encryption scheme, for example, using a public key-private key pair for encryption and decryption of messages. As another example, communications over communications link 114 can be encrypted using Transport Layer Security (TLS).

In some implementations, computing device 112 can include a display 116 for presenting a user interface to a user. In some examples described herein (e.g., examples described in connection with FIGS. 7A-7C and 8A-8H), computing device 112 can be a mobile computing device such as a smartphone or a tablet computer, and display 116 can include a touchscreen for receiving input and displaying a user interface and/or media content to a user. In some implementations, computing device 112 can further include volume controls 118 for controlling a volume of computing device 112.

In some implementations, computing device 112 can communicate with a content discovery server 122 over a communications link 126. Computing device 122 can communicate with content discovery server 122 to discover and/or browse content made available by a content delivery server 120. For example, a user can use computing device 112 to find media content to be presented by interacting with content discovery server 122. In some implementations, such media content can be presented using display 116 of computing device 112. In some implementations, computing device 112 can present a media content item that was selected using content discovery server 122, by requesting the media content item from content delivery server 120 and receiving the media content item over a communications link 124. In some implementations, each of content delivery server 120 and/or content discovery server 122 can be implemented on any suitable number of servers. Additionally or alternatively, in some implementations, the functions performed by content delivery server 120 and content discovery server 122 can be performed by the same device (e.g., by a common server computer).

In some implementations, communications links 124 and/or 126 can include a local area network (e.g., a home network) and/or a non-local network (e.g., the Internet). For example, computing device 112 can be connected to a common LAN such as a home network, and can connect to content discovery server 122 and/or content delivery server 120 through the Internet. As another example, content delivery server 120 and/or content discovery server 122 can be connected to a LAN that is common to computing device 112. In a more particular example, content delivery server 120 and/or content discovery server 122 can be located remotely from computing device 112, and communications links 124 and/or 126 can include a non-local network such as the Internet for accessing content from content delivery server 120 and/or discovering content using content discovery server 122. In another more particular example, content delivery server 120 and/or content discovery server 122 can be located locally to computing device 112, and communications links 124 and/or 126 can include a local network, such as a home network, to which content delivery server 120 and/or content discovery server 122 are connected. In such an example, a non-local network of communications links 124 and/or 126 (if it exists) may not be used when accessing content from content delivery server 120 and/or discovering content using content discovery server 122.

In some implementations, a user of computing device 112 can cause media content made available by content delivery server 120 to be transmitted to media receiving device 102, which can, in turn, cause the media content to be presented on display 108 of media playback device 106 to which media receiving device 102 is connected. In some implementations, media receiving device 102 can receive power from media playback device 106 through connection 110, and may only be available to receive media content when power is being received over connection 110 (e.g., when a port to which media receiving device 102 is connected is selected as an active input port).

In some implementations, if a user has selected a media content item to be presented from content delivery server 120, the user can select an icon presented to the user in connection with the selected media content item to cause the media content item to be presented using media receiving device 102 and media playback device 106.

In some implementations, when a media content item is to be presented from content delivery server 120 using media receiving device 102, the media content item can be transmitted to media receiving device 102 over a communications link 128. Communications link 128 can include a local area network (e.g., a home network) and/or a non-local network (e.g., the Internet). For example, media receiving device 102 and computing device 112 can both be connected to a common LAN such as a home network, and can connect to content delivery server 120 through the Internet. As another example, content deliver server 120 can be connected to a LAN that is common to computing device 112 and/or media receiving device 102. In a more particular example, content delivery server 120 can be located remotely from media receiving device 102 and/or computing device 112, and communications link 128 can include a non-local network such as the Internet for accessing content from content delivery server 120. In another more particular example, content delivery server can be located locally to media receiving device 102 and/or computing device 112, and communications link 128 can include a local network, such as a home network, to which both media receiving device 102 and content delivery server 120 are connected. In such an example, a non-local network of communications link 128 (if it exists) may not be used when accessing content from content delivery server 120.

In some implementations, a user can choose a media content item to be presented using media receiving device 102 from a memory of computing device 112 (e.g., the user can choose a video that is stored locally on computing device 112). Additionally or alternatively, a user can choose a media content item to be presented using media receiving device 102 that is stored on another computing device present on the same local area network (e.g., network attached storage, a memory of a personal computer on a home network, memory on a server on the same network, etc.). Such a media content item stored on a computing device connected to a local area network can be transmitted from computing device 112 to media receiver 102 over communications link 114 (or any other suitable communications link), without being transmitted through content delivery server 120.

In some implementations, a remote control 130 can include one or more input devices (e.g., buttons, a touchscreen, etc.) for receiving user input corresponding to commands to be issued for controlling a user interface and/or media content presented by computing device 112, and/or a user interface and/or media content presented using media receiving device 102 and/or media playback device 106. For example, remote control 130 can issue commands described below in connection with FIGS. 8A-8H. In some implementations, when a command is to be issued by remote control 130 to computing device 112, the command can be communicated over a communications link 132. In some implementations, communications link 132 can include any suitable communications link, for example, as described below in connection with FIG. 2. Additionally, in some implementations, communications link 132 can include a wireless connection between computing device 112 and media receiving device 102. For example, communications link 132 can include a connection using a short range communication protocol such as Bluetooth, Wireless USB, etc. As another example, communications link 132 can include an ad hoc wireless connection using any suitable communication standard, such as one of the IEEE 802.11 family of wireless communication standards. Additionally or alternatively, in some implementations, communications link 132 can include a network, such as a local area network (LAN) having wired and/or wireless connections.

Figure 2:
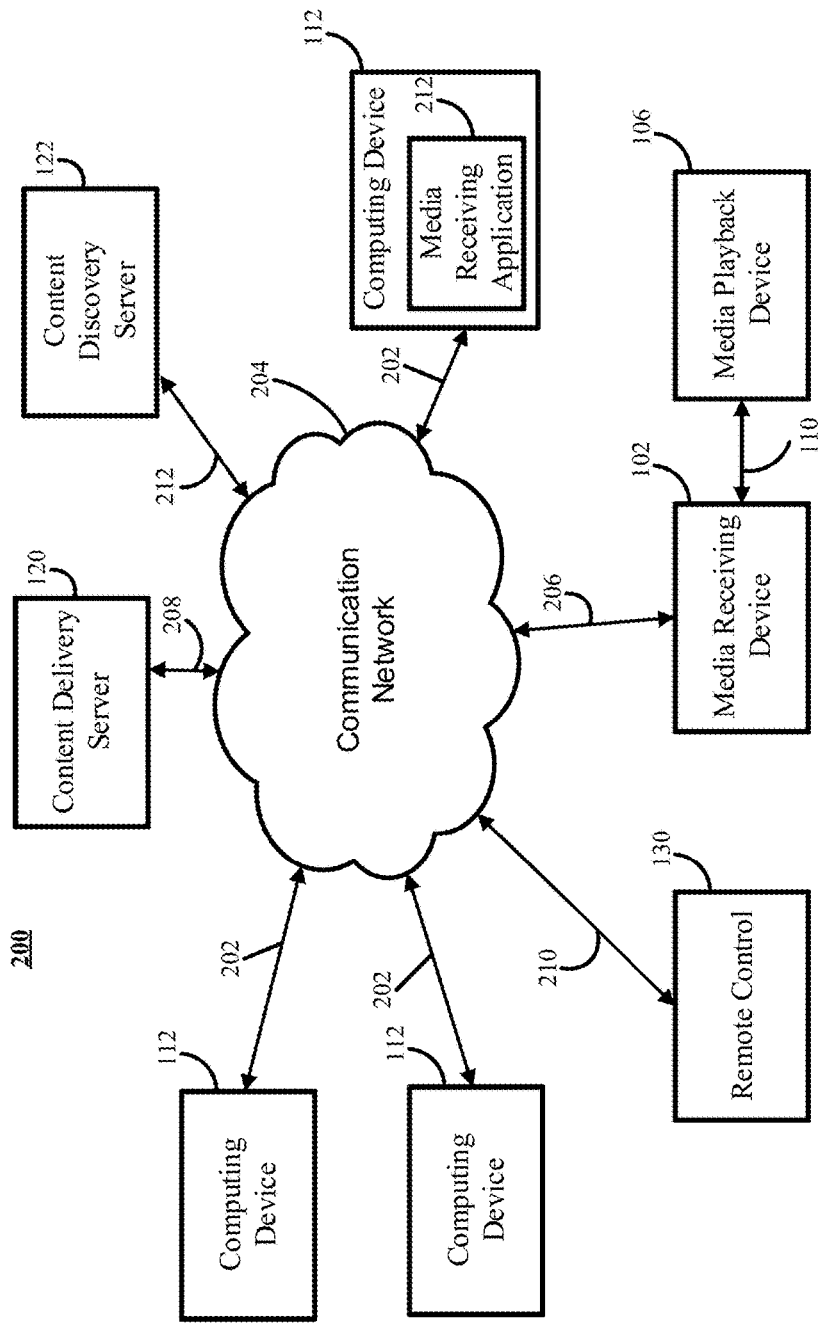
FIG. 2 shows an example of a generalized schematic diagram of a system on which the mechanisms for presenting a virtual operating system on a display device as described herein can be implemented in accordance with some implementations of the disclosed subject matter.

FIG. 2 shows an example 200 of a generalized schematic diagram of a system on which the mechanisms for presenting a virtual operating system on a display device as described herein can be implemented in accordance with some implementations of the disclosed subject matter. As illustrated, system 200 can include one or more computing devices 112. Computing devices 112 can be local to each other or remote from each other. Computing devices 112 can be connected by one or more communications links 202 to a communications network 204 that can be linked via a communications link 206 to media receiving device(s) 102, via a communications link 208 to content delivery server 120, via communications link 212 to content discovery server 122, via communications links 202 to other computing devices 112, and via communications link 210 to remote control 130.

In some implementations, each of the computing devices 112, content delivery server 120, content discovery server 122, media receiving device 102, and remote control 130 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 112 can be implemented as a smartphone, a tablet computer, a wearable computer, a personal computer, a laptop computer, a gaming console, a digital media receiver, a set-top box, a smart television, a server, etc.

Communications network 204 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 202, 206, 208, and 212 can be any communications links suitable for communicating data among computing devices 112, media receiving device 102, content delivery server 120, content discovery server 122, and remote control 130, such as network links, dial-up links, wireless links, hard-wired links, any other suitable communications links, or any suitable combination of such links. Computing devices 112 can discover, browse, download, stream, store, playback, transmit, and/or otherwise present content stored locally at computing device 112 and/or stored remotely at content delivery server 120 using any suitable technique(s).

System 200 can include media receiving device 102 as described above in connection with, for example, FIG. 1, and can include a media receiving application 214 installed on and/or running on one or more of computing devices 112, which can replicate the functions of media receiving device 102 using computing device 112.

System 200 can include one or more content delivery servers 120. Content delivery server 120 can be any suitable server for providing access to media content items in accordance with the mechanisms described herein, such as a processor, a computer, a data processing device, and/or any suitable combination of such devices.

System 200 can include one or more content discovery servers 122. Content discovery server 122 can be any suitable server for facilitating discovery and/or browsing of media content items accessible on content delivery server 120 in accordance with the mechanisms described herein, such as a processor, a computer, a data processing device, and/or any suitable combination of such devices.

In some implementations, communications link 114 described above in connection with FIG. 1 can include communications link 202, communication network 204, and communications link 206; communications link 124 described above in connection with FIG. 1 can include communications link 202, communication network 204, and communications link 208; communications link 126 described above in connection with FIG. 1 can include communications link 202, communication network 204, and communications link 212; communications link 128 described above in connection with FIG. 1 can include communications link 206, communication network 204, and communications link 208; and communications link 132 described above in connection with FIG. 1 can include communications link 202, communications network 204 and communications link 210.

Figure 3:
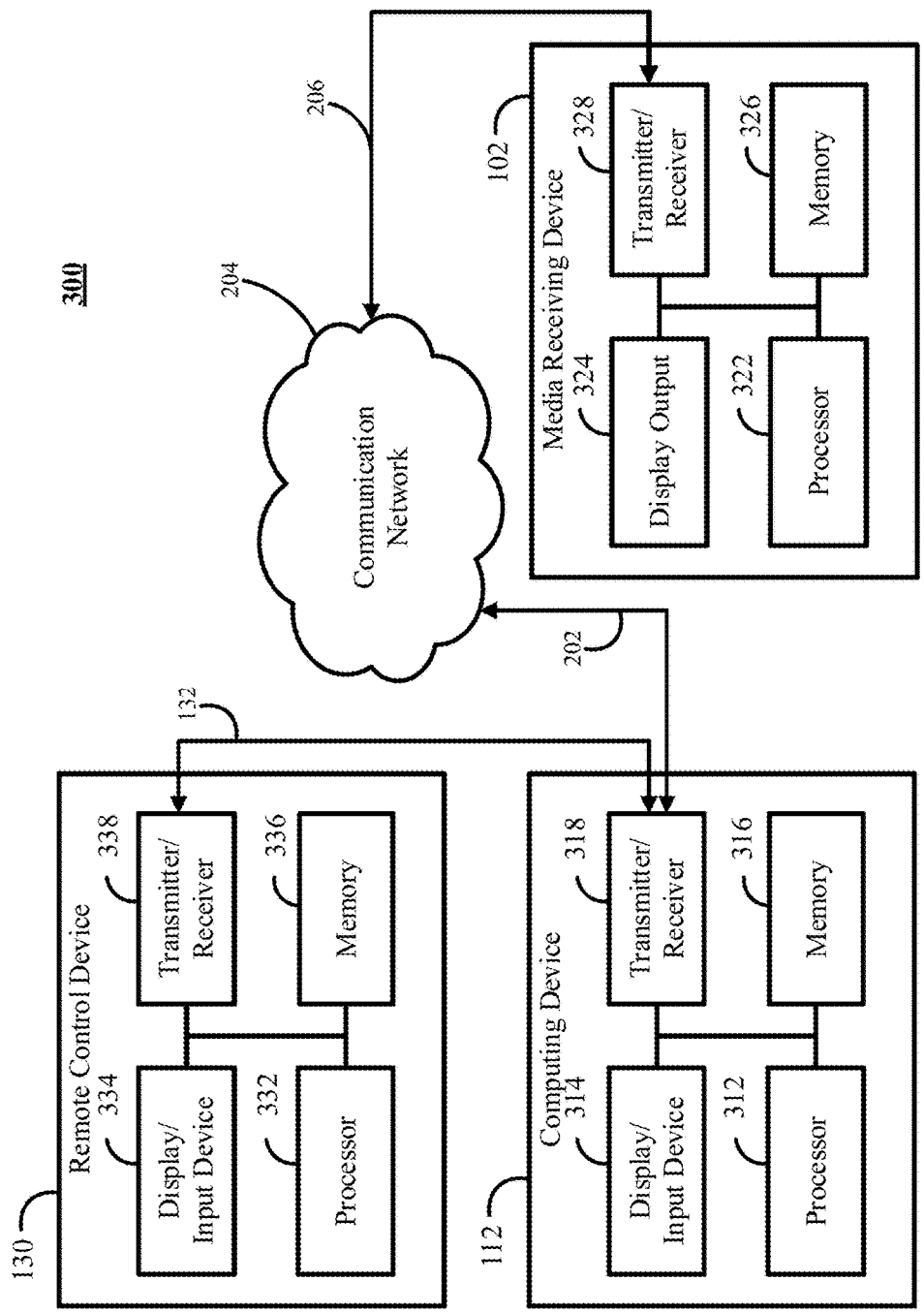
FIG. 3 shows an example of hardware that can be used to implement one of the computing devices, one of the media receiving devices, and the remote control depicted in FIGS. 1 and 2 in accordance with some implementations of the disclosed subject matter.

FIG. 3 shows an example 300 of hardware that can be used to implement one of computing devices 112, media receiving device 102, and remote control 130 depicted in FIG. 2 in accordance with some implementations of the disclosed subject matter. Referring to FIG. 3, computing device 112 can include a hardware processor 312, a display/input device 314, memory 316, and a transmitter/receiver 318, which can be interconnected. In some implementations, memory 316 can include a storage device (such as a non-transitory computer-readable medium) for storing a computer program for controlling hardware processor 312.

Hardware processor 312 can use the computer program to present on display/input device 314 media content and/or an interface that allows a user to, among other things, cause media content presented on display/input device 314 to be presented on a media receiving device, such as media receiving device 102. It should also be noted that data received through communications link 202, communications link 132, and/or any other communications links can be received from any suitable source. In some implementations, hardware processor 312 can send and receive data through communications link 202, communications link 132, and/or any other communications links using, for example, a transmitter, receiver, transmitter/receiver, transceiver, or any other suitable communication device, such as transmitter/receiver 318. Display/input device 314 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 318 can include any suitable transmitter and/or receiver for transmitting and/or receiving, among other things, media content including audio and/or video content.

Media receiving device 102 can include a hardware processor 322, a display output 324, memory 326, and a transmitter/receiver 328, which can be interconnected. In some implementations, memory 326 can include a storage device (such as a non-transitory computer-readable medium) for storing a computer program for controlling hardware processor 322.

Hardware processor 322 can use the computer program to provide media content and/or a user interface to display output 324 for presenting the media content and/or user interface on a media playback device. It should also be noted that data received through communications link 206 or any other communications links can be received from any suitable source. In some implementations, hardware processor 322 can send and receive data through communications link 206 or any other communications links using, for example, a transmitter, receiver, transmitter/receiver, transceiver, or any other suitable communication device, such as transmitter/receiver 328. Display output 324 can include hardware, software and/or firmware for outputting media content and/or a user interface to a media playback device (e.g., media playback device 106) in any suitable format, and can include input/output connector 104 as described above in connection with FIG. 1. Transmitter/receiver 328 can include any suitable transmitter and/or receiver for transmitting and/or receiving, among other things, media content including audio and/or video content.

Remote control 130 can include a hardware processor 332, a display/input device 334, memory 336, and a transmitter/receiver 338, which can be interconnected. In some implementations, memory 336 can include a storage device for storing data received through communications link 132 and/or through other links. The storage device (such as a non-transitory computer-readable medium) can further include a remote control program for controlling hardware processor 332.

Hardware processor 332 can use the remote control program to communicate with computing device 112 and/or media receiving device 102. It should also be noted that data received through communications link 132 or any other communications links can be received from any suitable source. In some implementations, hardware processor 332 can send and receive data through communications link 132 or any other communications links using, for example, a transmitter, receiver, transmitter/receiver, transceiver, or any other suitable communication device, such as transmitter/receiver 338. In some implementations, hardware processor 332 can receive commands and/or values transmitted by one or more users. Display/input device 334 can include a touchscreen, a projector, a speaker(s), and/or any other suitable display and/or presentation devices, and can further include a key matrix, a microphone, a touchpad, a voice recognition circuit, a touch interface of a touchscreen, and/or any other suitable input device. Transmitter/receiver 338 can include any suitable transmitter and/or receiver for transmitting and/or receiving, among other things, media content including audio and/or video content.

Figure 4:
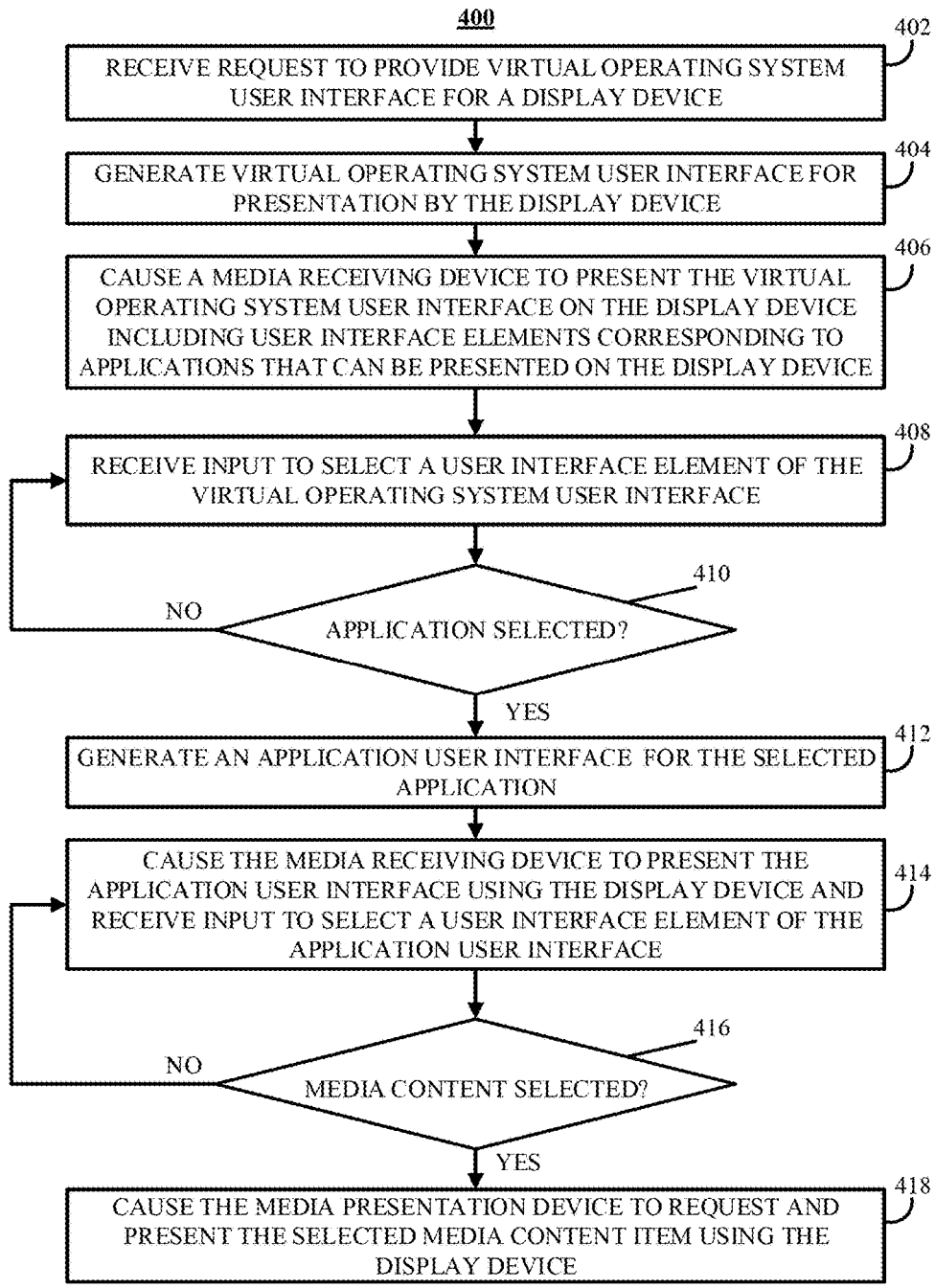
FIG. 4 shows an example of a process for presenting a virtual operating system on a display device in accordance with some implementations of the disclosed subject matter.

FIG. 4 shows an example 400 of a process for presenting a virtual operating system on a display device in accordance with some implementations of the disclosed subject matter. At 402, process 400 can receive a request to provide a virtual operating system user interface for a display device. In some implementations, such a request can be received using any suitable technique or combination of techniques, and/or can be received from any suitable source. For example, in some implementations, process 400 can receive the request in response to an application for presenting a virtual operating system on a display device being launched and/or opened on a computing device executing process 400. In a more particular example, process 400 can be executed as part of the application for presenting the virtual operating system.

As another example, process 400 can receive the request from a media receiving device (e.g., media receiving device 102) associated with a computing device executing process 400 indicating that media receiving device 102 is not currently presenting media content and/or that no media content has been requested for presentation. In a more particular example, media receiving device 102 can send such a request when audio and/or video data output by media receiving device 102 is being presented by a display device (e.g., media playback device 106 and/or a display coupled to media playback device 106), but media content is not currently being presented. In another more particular example, media receiving device 102 can send such a request when media receiving device 102 is initially powered on. In yet another more particular example, media receiving device 102 can send such a request when an input of media playback device 106 to which media receiving device 102 is connected is selected as an active input.

As yet another example, process 400 can receive the request in response to a user selection of a notification and/or user interface element indicating that a media receiving device (e.g., media receiving device 102) is present that can be used for presenting a virtual operating system on a display device. In a more particular example, a computing device (e.g., computing device 112) executing process 400 can detect the presence of media receiving device 102 and inform a user that media receiving device 102 can be used for presenting a virtual operating system on a display device that can be used to, e.g., browse for media content on the display device to be presented using the display device.

At 404, process 400 can generate a virtual operating system user interface for presentation by the display device using any suitable technique or combination of techniques. As described below in connection with FIG. 5, process 400 can select one or more applications that are to be included in the virtual operating system user interface, select which applications are to be presented upon the virtual operating system user interface first being presented using the display device, can format the virtual operating system user interface based on properties of the display device, etc.

In some implementations, the virtual operating system user interface generated by process 400 can be a graphical user interface that includes any suitable graphics, any suitable features and/or any suitable style of user interface. For example, the virtual operating system user interface can include a menu function, a settings function, one or more applications, a search function, etc., with corresponding user interface elements for these functions and/or applications.

At 406, process 400 can cause a media receiving device to present the virtual operating system user interface using a display device. In some implementations, process 400 can use any suitable technique or combination of techniques to cause the media receiving device to present the virtual operating system user interface. For example, process 400 can cause a computing device (e.g., computing device 112) executing process 400 to stream the virtual operating system user interface to the media receiving device (e.g., media receiving device 102) as audio and/or video to be presented by media receiving device 102. In a more particular example, the virtual operating system user interface can be streamed to media receiving device 102 without being presented by a display (e.g., display/input device 314) of computing device 112 executing process 400. In such an example, display/input device 314 can present: information related to the virtual operating system user interface being presented (e.g., information indicating that the virtual operating system user interface is being streamed to media receiving device 102, information identifying media streaming device 102, a remote control user interface, etc.); an application unrelated to the virtual operating system user interface (e.g., an email application, a web browser, etc.); a user interface for an operating system of computing device 112; a lock screen for computing device 112; and/or nothing at all (e.g., display/input device 314 can be in a display inhibited state such as a low power state or an off state).

As another more particular example, the virtual operating system user interface can be streamed to media receiving device 102 and can be simultaneously presented by computing device 112 such that the screen of computing device 112 is mirrored by the display device being used by media receiving device 102 to present the virtual operating system user interface.

At 408, process 400 can receive user input selecting a user interface element of the virtual operating system user interface. In some embodiments, a user interface element of the virtual operating system user interface can be selected using any suitable technique or combination of techniques. For example, as described below in connection with FIGS. 6 and 8A-8H, input to select a user interface element can be provided via a remote control (e.g., remote control 130) that sends commands to a computing device (e.g., computing device 112) executing process 400. As another example, user input can be provided via an input device of computing device 112 such as a touchscreen of computing device 112. In a more particular example, the touchscreen can be used to present a remote control user interface that can be used to select a user interface element of the virtual operating system user interface that is being presented by media receiving device 102. In another more particular example, the touchscreen can be used to present a keyboard that can be used to enter search queries for media content, applications and/or functions of the virtual operating system user interface that is being presented by media receiving device 102. In yet another more particular example, the touchscreen can be used to receive user input as gestures in a display inhibited state, such as swipes to navigate between user interface elements, taps and presses to select a user interface element, etc.

At 410, process 400 can determine if an application has been selected. If an application has not been selected ("NO" at 410), process 400 can return to 408 and can continue to receive input to select a user interface element of the virtual operating system user interface. For example, if a menu user interface element, a search user interface element, a settings user interface element, etc., is selected, process 400 can cause the virtual operating system user interface to present an appropriate user interface corresponding to the selected function(s).

Otherwise, if process 400 determines that an application has been selected ("YES" at 410), process 400 can proceed to 412. At 412, process 400 can generate an application user interface for the selected application. In some implementations, process 400 can use any suitable technique or combination of techniques to generate the application user interface. For example, the application user interface can be generated based on instructions associated with the application. In such an example, the creator and/or publisher of the application can include instructions for presenting a user interface of the application for a display device with a format of the display device being used by media receiving device 102 to present the virtual operating system user interface. These instructions can cause a different user interface to be presented on a television than a user interface that would be presented on a smartphone or tablet computer (e.g., a computing device with a touchscreen interface), and different than a user interface that would be presented on a personal computer (e.g., a computing device with a keyboard and pointing device, such as a mouse). Rather, these instructions can, in some implementations, cause an application user interface for a television to be presented that is suitable for navigation using a remote control (e.g., remote control 130, a remote control user interface presented by computing device 112, etc.). As another example, the application user interface can be generated based on instructions received from a remote server. In a more particular example, the application user interface can be a web page that is requested from an address associated with the application. Such a web page can be used to generate the application user interface in a format that is appropriate for the display device.

As yet another example, the computing device executing process 400 (e.g., computing device 112) can generate the application user interface based on the instructions for generating the application user interface for computing device 112.

At 414, process 400 can cause the media receiving device (e.g., media receiving device 102) to present the application user interface using the display device. In some implementations, process 400 can use any suitable technique or combination of techniques to cause the media receiving device to present the virtual operating system user interface. For example, as described above in connection with presenting the virtual operating system user interface at 406, process 400 can cause the computing device executing process 400 (e.g., computing device 112) to stream the application user interface to the media receiving device (e.g., media receiving device 102) as audio and/or video to be presented by media streaming device 102.

Additionally, in some implementations, process 400 can receive input for navigating the application user interface and/or selecting media content to be presented. Such input can be received using any suitable technique or combination of techniques, such as techniques described above in connection with receiving input to select a user interface element of the virtual operating system user interface at 408.

At 416, process 400 can determine whether one or more media content items have been selected for presentation using the media receiving device. If process 400 determines that one or more media content items have not been selected for presentation using the media receiving device ("NO" at 416), process 400 can return to 414 and continue to present the application user interface and/or receive input to navigate the application user interface.

Otherwise, if process 400 determines that one or more media content items have been selected for presentation using the media receiving device ("YES"), process 400 can proceed to 418. At 418, process 400 can cause the media receiving device to request and/or present the one or more media content items selected at 416. In some implementations, process 400 can cause the one or more media content items to be presented using any suitable technique or combination of techniques. For example, process 400 can send instructions to the media receiving device (e.g., media receiving device 102) to request media content from a particular address and/or to request media content corresponding to particular identifying information. As another example, process 400 can cause the selected media content to be streamed to the media receiving device (e.g., where the selected media content is locally stored by the computing device executing process 400, where the selected media content is downloaded and/or streamed by the computing device executing process 400 in cases where media receiving device 102 is not configured to stream the media content directly, etc.). As yet another example, process 400 can cause the one or more media content items to be presented using techniques described below in connection with FIGS. 9-15E, such as by using the sender application described below in connection with, among others, FIG. 9.

Figure 5:
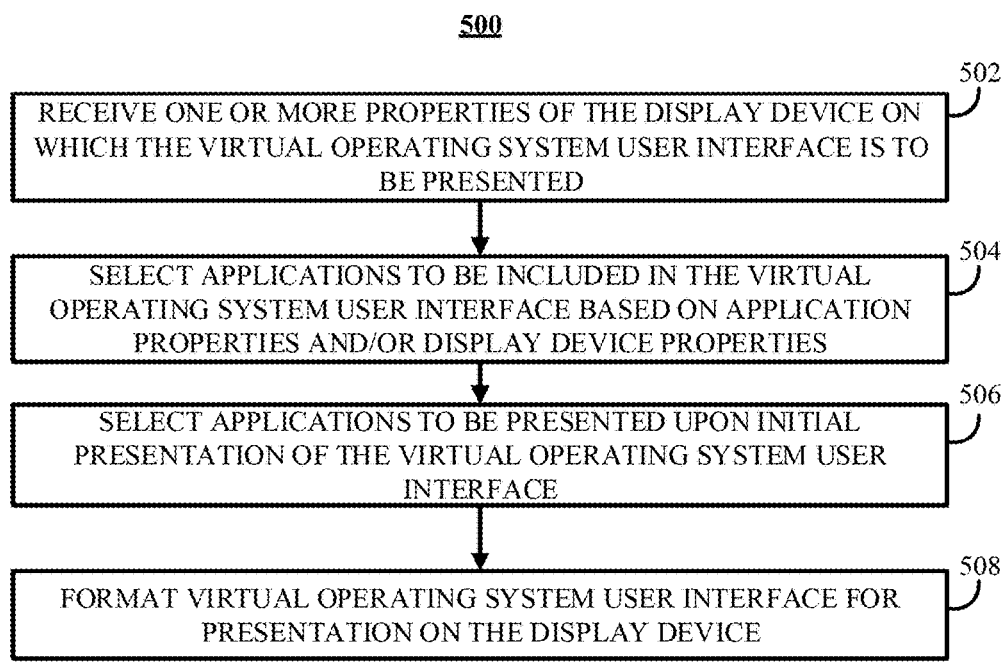
FIG. 5 shows an example of a process for generating a virtual operating system user interface in accordance with some implementations of the disclosed subject matter.

FIG. 5 shows an example 500 of a process for generating a virtual operating system user interface in accordance with some implementations of the disclosed subject matter. At 502, process 500 can receive one or more properties of the display device on which the virtual operating system user interface is to be presented. In some implementations, the one or more properties can be received from any suitable source and/or can be received using any suitable technique or combination of techniques. For example, in some implementations, the one or more properties of the display device can be received from the media receiving device (e.g., media receiving device 102) that is to use the display device to present the virtual operating system user interface. In such an example, media receiving device 102 can communicate with the display device (e.g., via communications over an HDMI connection) to receive one or more properties of the display. As another example, the one or more properties of the display device can be received via user input to the computing device (e.g., computing device 112) executing process 500. As yet another example, the one or more properties of the display device can be received from a remote server as a response to a query specifying information about the display device. In such an example, the information about the display device can be information identifying a brand of the display device, information identifying a model of the display device, an image of the display device, etc.

At 504, process 500 can select one or more applications to be included in the virtual operating system user interface based on application properties and/or the received one or more display properties. In some implementations, process 500 can use any suitable technique or combination of techniques to select the one or more applications and/or can use any suitable criterion or criteria to select the one or more applications. For example, process 500 can select applications that provide access to media content. As another example, process 500 can select applications associated with services that are compatible with streaming media content directly to a media receiving device (e.g., media receiving device 102) in response to a request for the media content from media receiving device 102. As yet another example, process 500 can select applications based on application metadata indicating that the application includes instructions for formatting the application user interface for a device type corresponding to the display device. As still another example, process 500 can select applications based on the user interface being compatible with navigation using a remote control (e.g., in lieu of or in addition to navigation using a touchscreen).

In some implementations, process 500 can select from among applications installed on the computing device (e.g., computing device 112) executing process 500. Additionally or alternatively, in some implementations, process 500 can select from applications that may or may not be installed on the computing device, but which are popular for presenting content on the type of display device being used (e.g., based on the one or more device properties received) and/or which are associated with services that are compatible with streaming media content directly to a media receiving device (e.g., media receiving device 102) in response to a request for the media content from media receiving device 102. In such implementations, applications that are not installed on the computing device (and/or applications for which a version for presenting the application user interface on the display device are not installed) can be downloaded and installed on the computing device and/or such applications can be executed by a remote server and the application user interface for presentation on the display device can be streamed to the media receiving device as a video object from the remote server.

In some implementations, process 500 can select any suitable type of applications, such as applications for browsing and/or viewing video content (e.g., movies, video clips, etc.), applications for browsing and/or playing audio content (e.g., music, audio books, podcasts, etc.), applications for browsing and/or viewing visual content (e.g., photographs, text, web pages, maps, etc.), and/or any other suitable type of application.

At 506, process 500 can select one or more applications to be presented upon initial presentation of the operating system (e.g., a home screen of the operating system). In some implementations, process 500 can use any suitable technique or combination of techniques to select the one or more applications to be presented upon initial presentation of the operating system. For example, process 500 can select the applications for initial presentation based on how often the applications are used by the computing device executing process 500. As another example, process 500 can select the applications for initial presentation based on how often the applications are used in association with a media receiving device. As yet another example, process 500 can select the applications for initial presentation based on their popularity for use with media receiving devices.

At 508, process 500 can format the virtual operating system user interface for initial presentation on the display device based on the applications selected at 504 and/or 506. In some embodiments, process 500 can use any suitable technique or combination of techniques to format the virtual operating system user interface. For example, process 500 can populate the virtual operating system user interface with user interface elements corresponding to the applications selected at 504 and/or 506. As another example, process 500 can generate the graphical user interface elements based on instructions stored in memory of the computing device executing process 500.

Figure 6:
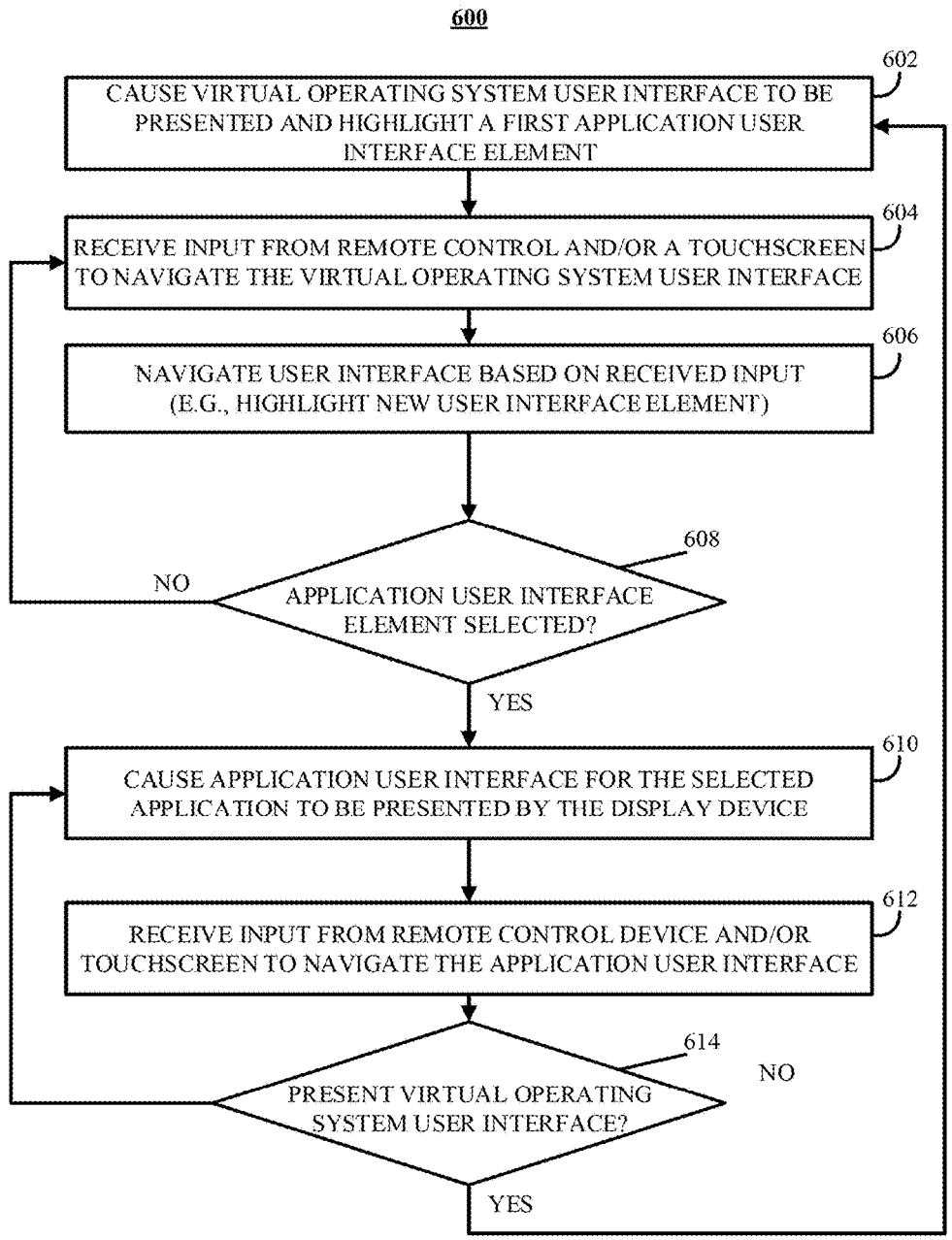
FIG. 6 shows an example of a process for navigating a virtual operating system user interface and an application user interface in accordance with some implementations of the disclosed subject matter.

FIG. 6 shows an example 600 of a process for navigating a virtual operating system user interface and an application user interface in accordance with some implementations of the disclosed subject matter. As shown in FIG. 6, at 602, process 600 can cause a virtual operating system user interface to be presented by a media receiving device (e.g., media receiving device 102) using a display device and can highlight a user interface element of the virtual operating system user interface corresponding to a first application. In some implementations, the user interface element corresponding to the first application can be highlighted using any suitable technique or combination of techniques.

At 604, process 600 can receive input from a remote control (e.g., remote control 130) in communication with a computing device (e.g., computing device 112) executing process 600 and/or a touchscreen of the computing device executing process 600. In some implementations, the input can correspond to any suitable command and/or instruction for navigating the virtual operating system user interface. For example, the input can correspond to a directional input (e.g., up, down, left, right, etc.) for causing a user interface element adjacent to the currently highlighted user interface element to be highlighted. As another example, the input can correspond to a function (e.g., home, back, recent applications, search, power, etc.) that is to be performed by the virtual operating system.

At 606, process 600 can navigate the virtual operating system user interface based on the input received at 604. For example, process 600 can highlight a new user interface element based on the input received at 604. As another example, process 600 can highlight a search user interface element for entering a search query based on the input received at 604. As yet another example, process 600 can select a currently highlighted user interface element based on the input received at 604.

At 608, process 600 can determine whether a user interface element corresponding to an application has been selected. If process 600 determines that a user interface element corresponding to an application has not been selected ("NO" at 608), process 600 can return to 604 and continue to receive input for navigating the virtual operating system user interface.

Otherwise, if process 600 determines that a user interface element corresponding to an application has been selected ("YES" at 608), process 600 can proceed to 610. At 610, process 600 can cause the media receiving device to present an application user interface using the display device. In some implementations, process 600 can use any suitable technique or combination of techniques to present the application user interface, such as techniques described above in connection with 414 of FIG. 4.

At 612, process 600 can receive input from a remote control (e.g., remote control 130) in communication with a computing device (e.g., computing device 112) executing process 600 and/or a touchscreen of the computing device executing process 600 to navigate the application user interface. In some implementations, process 600 can use any suitable technique or combination of techniques to navigate the application user interface, such as techniques for navigating the virtual operating system user interface described above in connection with 604 and 606.

At 614, process 600 can determine if input has been received to close the application user interface and/or otherwise navigate back to the virtual operating system user interface. In some implementations, process 600 can determine that the virtual operating system user interface is to be presented (e.g., that a user has chosen to navigate back to the virtual operating system user interface from the application user interface) based on any suitable input. For example, process 600 can determine from input indicating that a "home" button on a remote control (e.g., remote control 130) has been selected, that the virtual operating system user interface is to be presented. As another example, process 600 can determine from input indicating that a "back" button on a remote control (e.g., remote control 130) has been selected while a home screen of the application user interface is being presented, that the virtual operating system user interface is to be presented. As yet another example, process 600 can determine from input indicating that a "recent application" function has been invoked, that the virtual operating system user interface is to be presented to present to the user recent applications that have been used to facilitate selection of one of those recent applications.

If process 600 determines that the virtual operating system user interface is not to be presented ("NO" at 614), process 600 can return to 610 and continue to cause the application user interface to be presented. Otherwise, if process 600 determines that the virtual operating system user interface is to be presented ("YES" at 614), process 600 can return to 602 to cause the virtual operating system user interface to be presented.

Figure 7A:
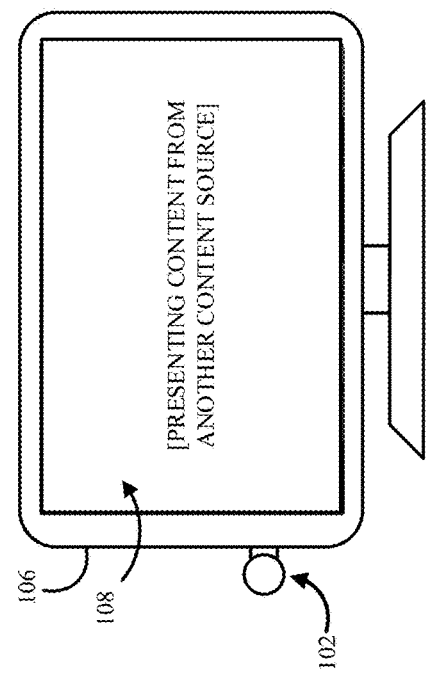
Figure 7A:
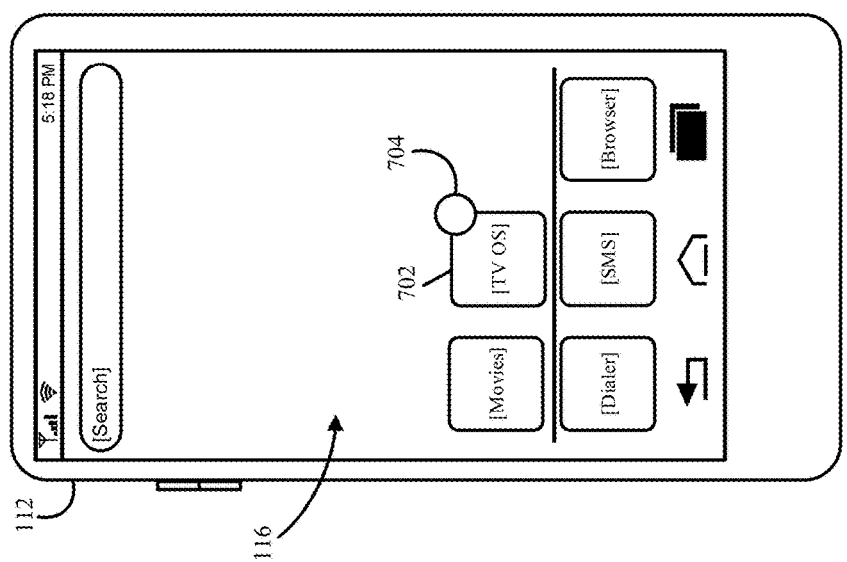
Figure 7C:
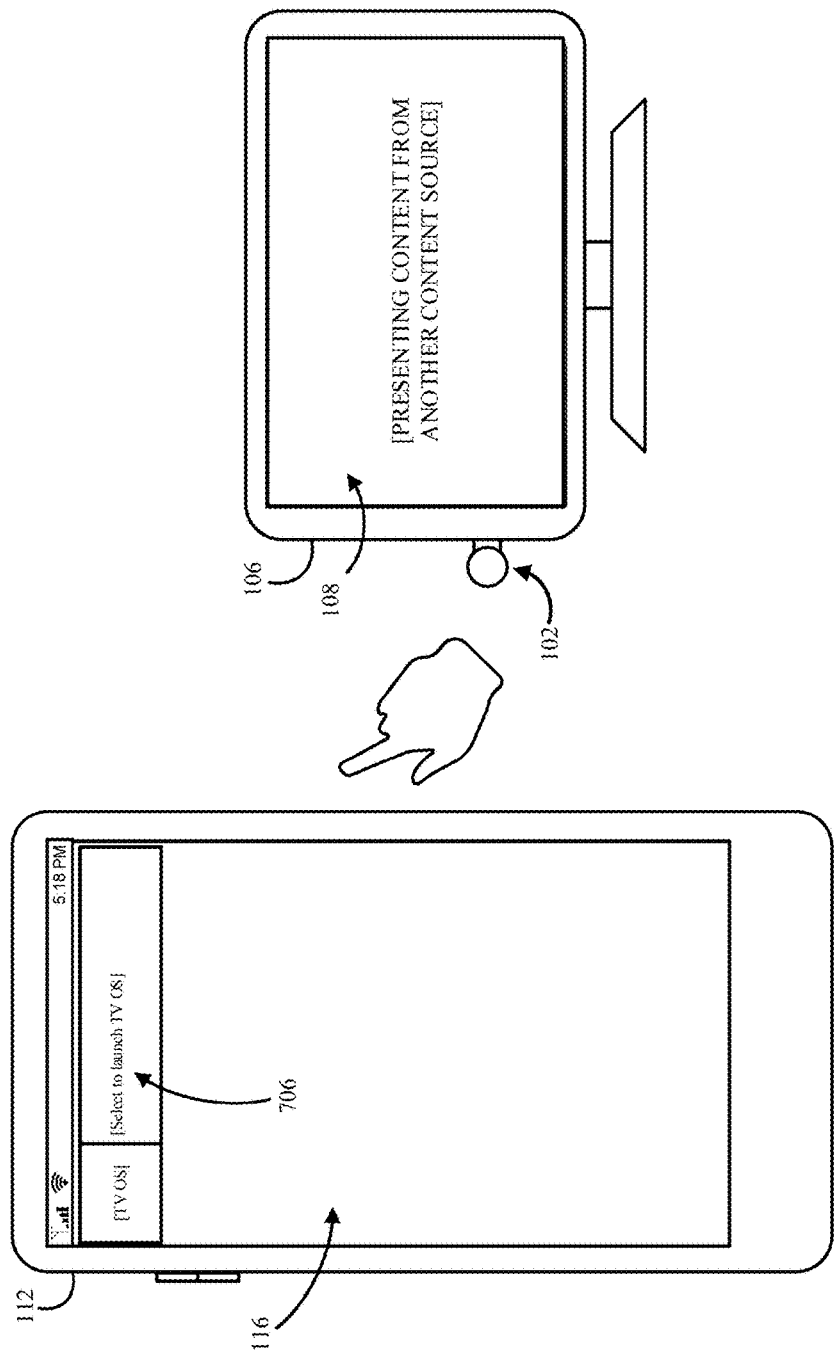

FIGS. 7A-7C show an example of using the mechanisms described herein for causing a virtual operating system to be presented on a display device from computing device 112, which can include at least a portion of each of process 400, process 500 and process 600 in accordance with some implementations of the disclosed subject matter.

FIG. 7A shows an example of computing device 112 presenting a mobile operating system user interface including a number of applications that can be executed by computing device 112 using display 116, while media playback device 106 presents content other than the virtual operating system user interface in accordance with some implementations of the disclosed subject matter. In the example shown in FIG. 7A, the mobile operating system user interface includes a user interface element 702 corresponding to an application for presenting a virtual operating system on a display device in accordance with the mechanisms described herein. As shown in FIG. 7A, a notification 704 can indicate that a media receiving device (e.g., media receiving device 102) is currently available for presenting the virtual operating system using display 108 of media playback device 106. In some implementations, as described above in connection with 400 of FIG. 4, launching the application corresponding to application element 702 can cause a request to be provided to process 400 to provide the virtual operating system user interface. Additionally, in some embodiments, notification 704 can be presented when media receiving device 102 is present and/or when computing device 112 can cause the virtual operating system user interface and/or media content to be presented using media receiving device 102.

FIG. 7B shows an example of the mobile operating system user interface being presented by computing device 112 when media receiving device 102 is available for presenting the virtual operating system, while media playback device 106 presents content other than the virtual operating system user interface in accordance with some implementations of the disclosed subject matter. In some implementations, a user can perform a predetermined action, such as a swipe from a top bezel of a touchscreen of computing device 112 to navigate to a notification screen.

FIG. 7C shows an example of a notification screen of the mobile operating system user interface of computing device 112, while media playback device 106 presents content other than the virtual operating system user interface in accordance with some implementations of the disclosed subject matter. In some implementations, a notification 706 can be presented in the notification screen for informing a user that media receiving device 102 is available for presenting the virtual operating system user interface. In some implementations, notification 706 can include information identifying the media receiving device (e.g., a semantically meaningful name such as "Living Room TV") and information indicating that selecting the notification will cause the virtual operating system user interface to be presented on the display device (e.g., media playback device 106) connected to media receiving device 102.

FIGS. 8A-8H show an example of using the mechanisms described herein for presenting and navigating a virtual operating system on a display device using computing device 112 and remote control 130, which can include at least a portion of each of process 400, process 500 and/or process 600 in accordance with some implementations of the disclosed subject matter.

Figure 8A:
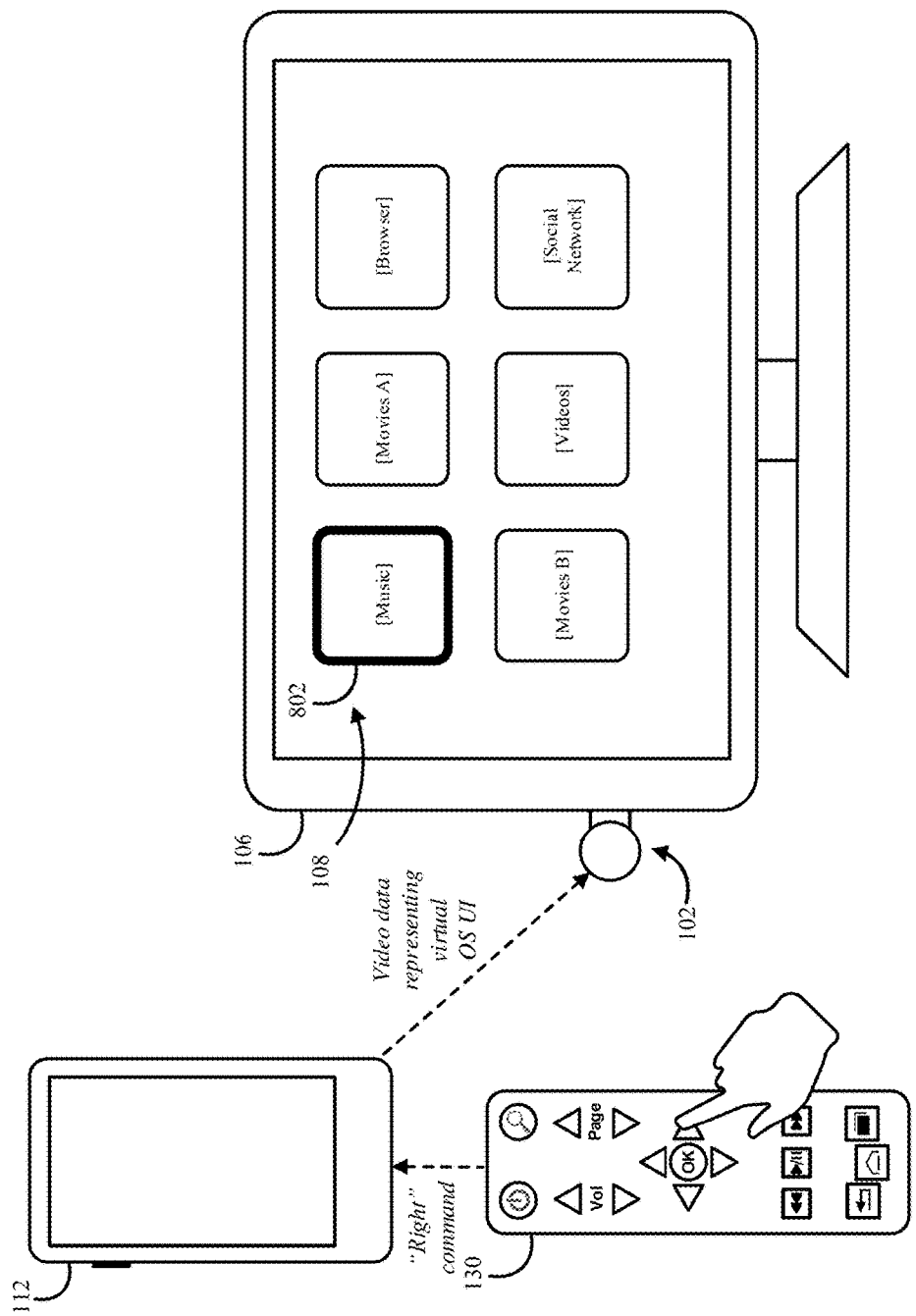

FIG. 8A shows an example of a virtual operating system user interface generated by computing device 112, streamed to media receiving device 102, and presented using display 108 of media playback device 106 in accordance with some implementations of the disclosed subject matter. As described above in connection with 602 of FIG. 6, a first application user interface element 802 of the virtual operating system user interface can be highlighted, as shown in FIG. 8A with a bold border. However, this is merely an example, and application element 802 can be highlighted using any suitable technique or combination of techniques. Note that although only user interface elements corresponding to applications are shown in FIG. 8A, this is merely for convenience, and user interface elements corresponding to other functions of the operating system, such as a menu function, a settings function, a search function, etc., can be included in the user interface presented by display 108.

As shown in FIG. 8A, a user can press a button on remote control 130, such as a "right" directional button, to control the user interface presented on display 108. In some implementations, pressing the right directional button as shown in FIG. 8A can cause a "right" command to be sent from remote control 130 to computing device 112 (e.g., via communications link 132 described above in connection with FIG. 1). Responsive to this command, in some implementations, computing device 112 can change and/or update the video data that is being sent to media receiving device 102 to show that a new application user interface element 804 is now highlighted and selectable, as shown in FIG. 8B.

Figure 8B:
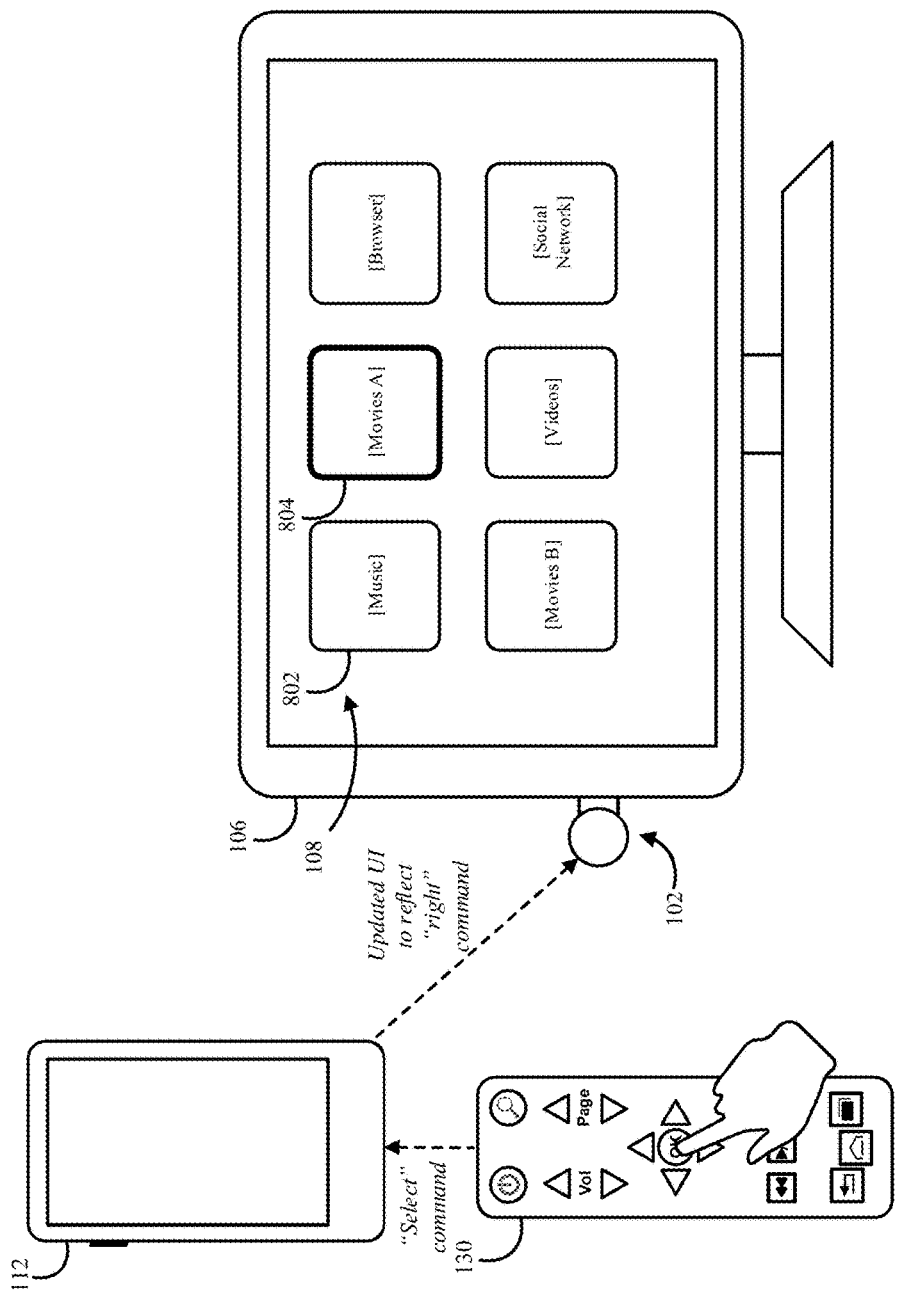

FIG. 8B shows an example of the virtual operating system user interface generated by computing device 112, streamed to media receiving device 102, and presented using display 108 of media playback device 106 with second application element 804 highlighted. As shown in FIG. 8B, a user can press a button on remote control 130, such as "OK," to control the user interface presented on display 108 to select the currently highlighted user interface element. In the example shown in FIG. 8B, second application element 804 is to be selected, which indicates that computing device 112 is to launch the application (e.g., a movie application) corresponding to second application element 804.

Figure 8C:
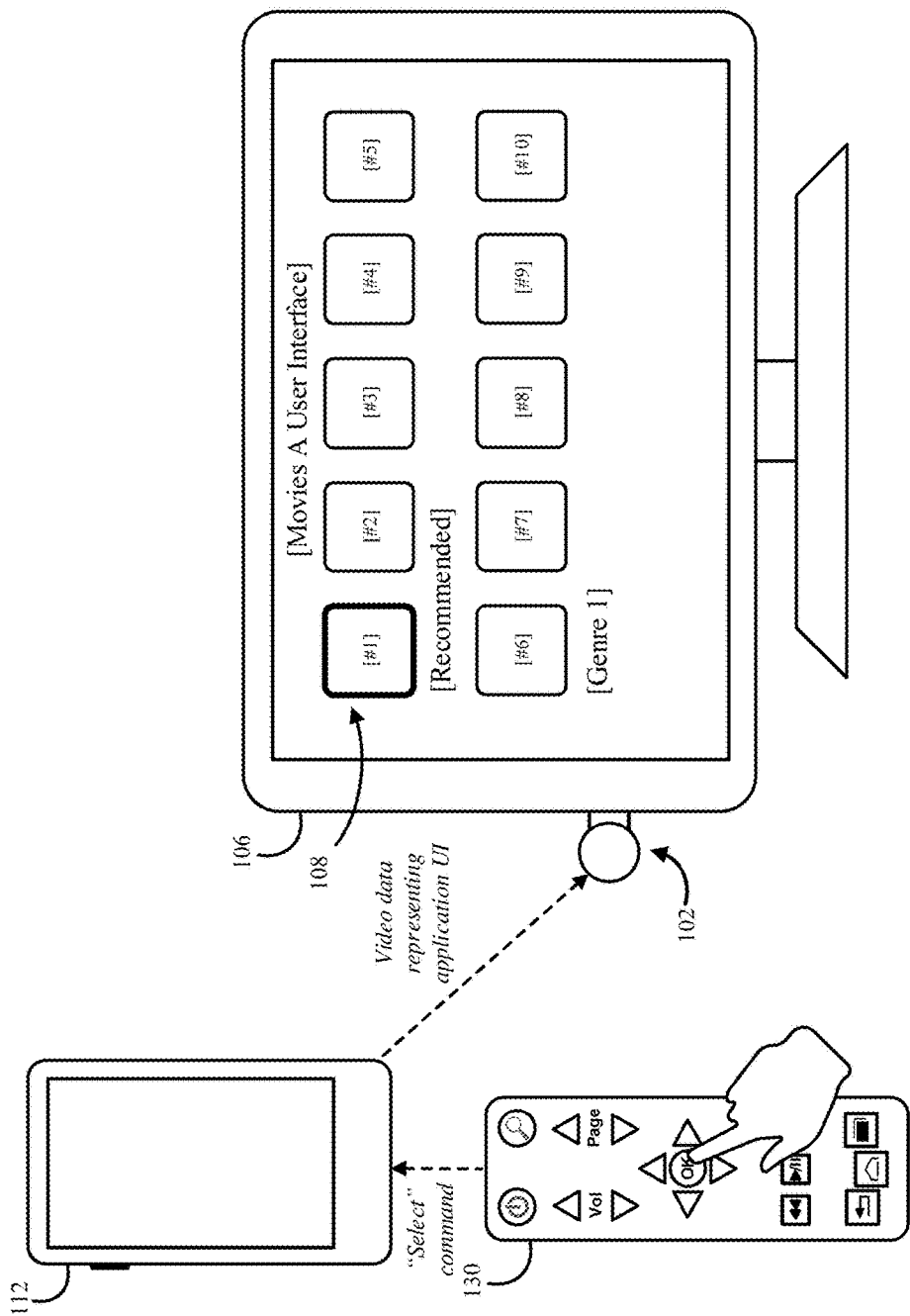

FIG. 8C shows an example of an application user interface for the application selected in the example of FIG. 8B that is generated by computing device 112, streamed to media receiving device 102, and presented using display 108 of media playback device 106. In some implementations, the application user interface can be generated and/or presented by computing device as described above in connection with 412 of FIG. 4 and 610 of FIG. 6. As shown in FIG. 8C, the application user interface includes user interface elements corresponding to media content items (e.g., movies) available from a service provider associated with the application, including a first movie 806 (e.g., movie "#1" in FIG. 8C) that is highlighted as being selectable. As shown in FIG. 8C, a user can press the "OK" button on remote control 130 to select the currently highlighted movie.

Figure 8D:
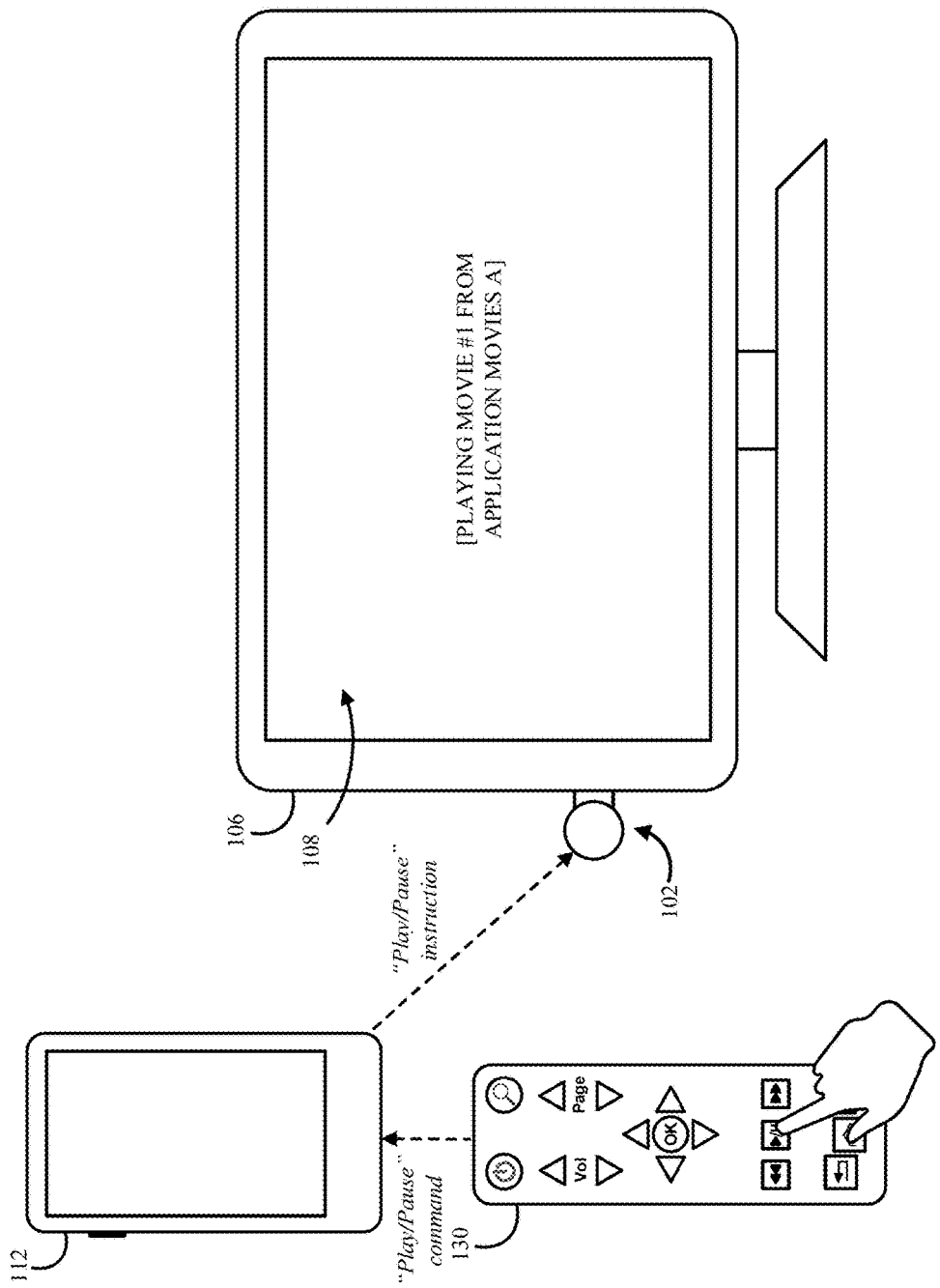

FIG. 8D shows an example of a media content item selected in the example of FIG. 8C, received by media receiving device 102 and presented using display 108 of media playback device 106. As described above in connection with 418 of FIG. 4, and as described below in connection with 918 of FIG. 9 and 1002 of FIG. 10, the media content being presented using display 108 can be received by media receiving device 102 from a remote content server (e.g., content delivery server 120) in response to a request for the media content item from media receiving device 102. Additionally, as described below in connection with 1006 of FIG. 10 and 1108 of FIG. 11, signals from computing device 112 can be sent to media receiving device 102 to control playback of the media content item. As shown in FIG. 8D, a user can press the "Play/Pause" button on remote control 130 to cause the media content item currently being presented by media receiving device 102 to paused and/or unpaused based on its current state. A "play/pause" command can be sent from remote control 130 to computing device 112, which can in turn send an instruction to media receiving device 102 to pause or unpause the media content currently being presented.

FIG. 8E shows an example of a media content item that was being presented in the example of FIG. 8D being presented in a paused state, in response to media receiving device 102 receiving the pause instruction from computing device 112. As shown in FIG. 8E, a user can press the "Back" button on remote control 130 to cause a previous user interface to be presented, such as the application user interface of the application used to select the media content item currently being presented by media receiving device 102.

FIG. 8F shows an example of the application user interface for the application used to select the media content presented in the examples of FIGS. 8D and 8E that is generated by computing device 112, streamed to media receiving device 102, and presented using display 108 of media playback device 106. As shown in FIG. 8F, a user can press the "Home" button on remote control 130 to cause the virtual operating system user interface to be presented.

FIG. 8G shows an example of the virtual operating system user interface that is generated by computing device 112, streamed to media receiving device 102, and presented using display 108 of media playback device 106. As shown in FIG. 8F, a user can press the "Power" button on remote control 130 to inhibit presentation of the virtual operating system user interface and/or media content being presented at the request of computing device 112.

FIG. 8H shows an example of the display 108 of media playback device 106 presenting content from a source other than media receiving device 102 in response an instruction from computing device 112 to power down media receiving device 102 and/or change the input source that is to be presented using display 108. Additionally or alternatively, rather than switching the output to an alternate source, the power command can cause media receiving device 102 to send an instruction to media playback device 106 to power off.

Figure 9:
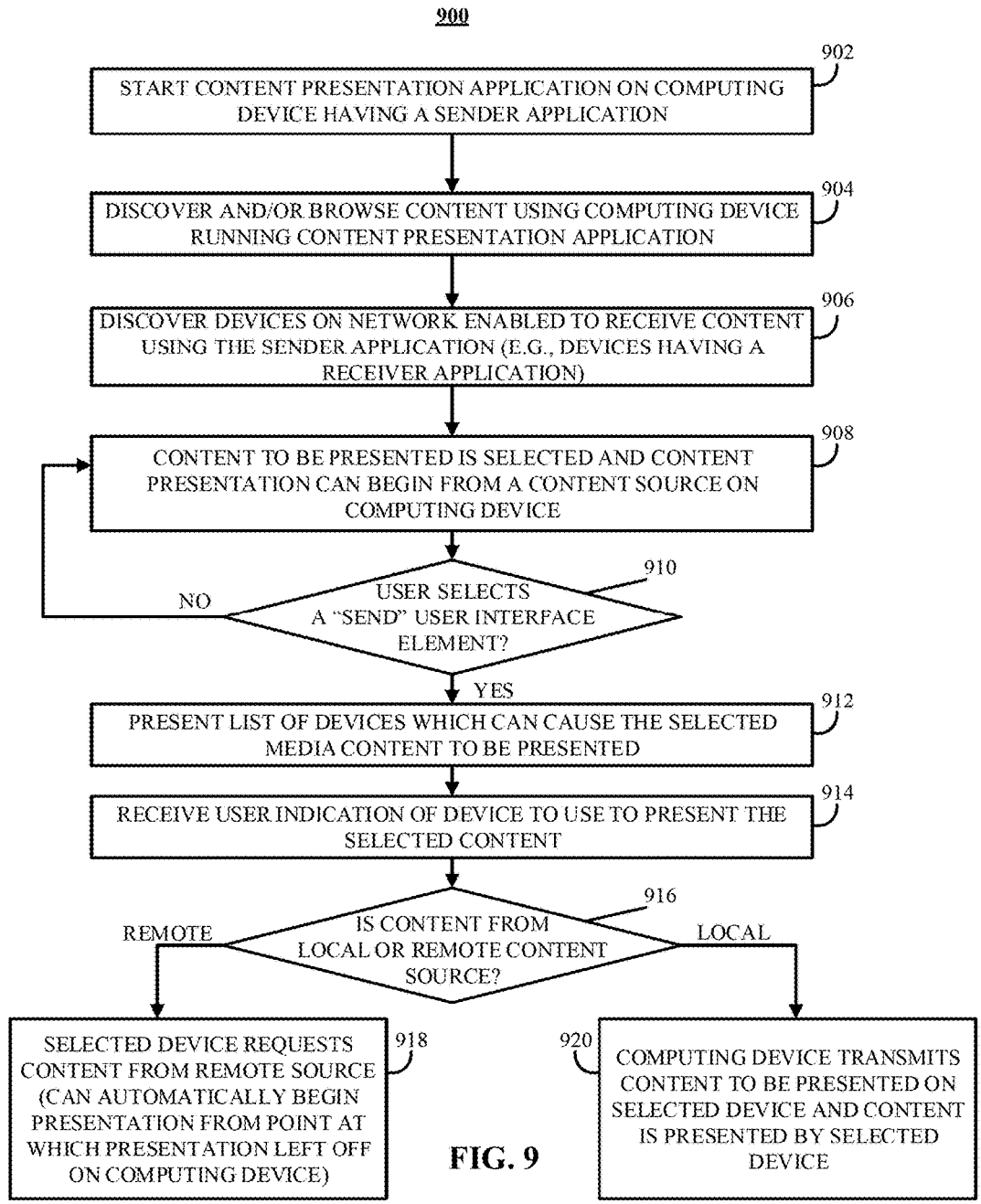
FIG. 9 shows an example of a process for presenting media content in accordance with some implementations of the disclosed subject matter.

FIG. 9 shows an example 900 of a process for presenting media content in accordance with some implementations of the disclosed subject matter. At 902, a content presentation application can be started on a computing device having a sender application. The content presentation application can include any suitable content presentation functions, such as discovering and/or browsing content to be presented, software to enable rendering and/or presentation of content such as video and/or audio content (which can include still images).

In some implementations, a sender application can be incorporated as part of the content presentation application and/or as a separate application that can be executed by an operating system of the computing device running the content presentation application (e.g., computing device 112). In some implementations, the sender application can be an application programming interface (API) for communication with a receiver application, for example, as described below. Such a sender application can be configured to receive commands from a computing device, such as computing device 112, and send these commands to a media receiving device (e.g., media receiving device 102). Among other things, the sender application can instruct a computing device to perform the following functions: cause a computing device running the application to discover the presence of media receiving devices (e.g., media receiving devices 102 on a home network, or the like); receive a selection of a media receiving device with which the computing device running the sender application is to communicate; and establish one or more communication channels with the selected media receiving device to be able to send and/or receive communications.

In some implementations, the sender application can include a set of standard software instructions, such as one or more portions of a software developer kit (SDK) (e.g., a Content Sender SDK) for performing, among other things, the above functions. The sender application can, for example, expose certain controls of a media receiving device (such as media receiving device 102), such as play, pause, stop, and volume control. Additionally, the sender application can periodically receive status updates from the media receiving device regarding, e.g., whether a media content item is being played, an identity of the media content item, a time of the media content item, etc.

In some implementations, the sender application can start in response to the computing device starting the content presentation application. Alternatively, the sender application can start when the computing device is started and run as a background application, or start in response to a user selecting an icon that corresponds to a function for using the sender application to present media content on a media receiving device.

At 904, the content presentation application can discover and/or browse content using the computing device running the content presentation application. For example, the content presentation application can be an application for a video sharing service that allows a user of the application to view videos uploaded by users of the video sharing service. Such a content presentation application can allow a user of the application to discover videos to watch using search functions, recommendations, curated lists, channels, randomly, or any other suitable techniques for facilitating discovery and/or browsing of content by a user. As another example, the content presentation application can be a Web browser that can, among other things, allow a user to discover and/or browse Web pages.

At 906, the sender application can cause the computing device running the sender application to discover media receiving devices (e.g., media receiving device 102) that are present on a network that the computing device is connected to (e.g., a home network). Any suitable technique(s) can be used to discover devices, such as multicasting a message to a particular address on the network, and launching an event listener to listen for replies from devices on the network that received the multicast message. Additionally, in some implementations, an event listener associated with the device executing process 900 can listen for messages sent from a media receiving device (e.g., media receiving device 102) that may not be a response to a multicast message previously sent by such a device. Such a message can be a broadcast, multicast, or unicast message sent by the media receiving device. In some implementations, the sender application can start and discover devices at 906 in response to the computing device launching the content presentation application and/or starting the sender application, in response to a user selecting a "send" icon as described below in connection with 910, periodically, or at any other suitable time.

At 908, the content presentation application can receive a user indication of a media content item to be presented, and presentation of the media content item can begin on the computing device running the content presentation application. Additionally or alternatively, the selected media content item may not be presented on the computing device upon selection, but instead the content presentation application can wait for a user instruction to present the media content item.

At 910, the content presentation application and/or the sender application can determine whether a user has selected a "send" icon (or any other suitable indication to send the media content item to a media receiving device, such as a voice command, entering a text command, etc.) to send the selected media content item to a media receiving device (e.g., media receiving device 102). A determination of whether the user has selected the "send" icon can be made using any suitable technique, for example by receiving a signal from the computing device running the content presentation application indicating that a user selection of the "send" icon has been received. If the content presentation application and/or sender application determines that a user selection of the "send" icon has not been received ("NO" at 910), process 900 can return to 908 and continue to present the selected media content item (if being presented). Otherwise, if the content presentation application and/or sender application determines that a user selection of the "send" icon has been received ("YES" at 910), process 900 can proceed to 912.

At 912, the sender application can cause the computing device running the sender application to present a list of media receiver devices which can cause the selected media content item to be presented. A list of media receiving devices (e.g., including media receiving device 102) can be created based on the media receiving devices that were discovered at 906. In some implementations, devices that have previously been used to present media content items using the sender application can be included in the list regardless of whether the device responded to the discovery request at 906. For example, devices that have previously been used can be presented to the user in the list of devices with an indication that the device was not discovered (e.g., the device is offline or not in the network). In some implementations, presenting the list of devices to the user can be omitted, for example, if the user has previously chosen a default media receiving device to use to present content, and/or if only one media receiving device is detected during device discovery at 906. In some implementations, device discovery at 906 can be performed in parallel with presentation of content at 908, in response to selection of "send" user interface element at 910 (e.g., in response to "YES" at 910), and/or at any other suitable time.

At 914, the sender application can receive an indication of a media receiving device to use to present the content selected at 908. For example, the sender application can receive a signal from the computing device running the sender application of a device that was selected by the user as the media receiving device to use to present the media content item selected at 908.

In some implementations, a communication session between the computing device running the sender application and the selected media receiving device can be initiated in response to receiving the selection of the media device at 914. Initiation of the session can cause a secure connection to be created between the computing device running the sender application and the selected media receiving device running the receiver application. This session can include sending a call to the selected media receiving device over the network and launching an application for causing the media content item selected at 908 to be presented using the selected media receiving device.

In some implementations, initiating the session can further include launching a listener for receiving communications from a receiver application running on the selected media receiving device. After the session is initiated, a channel can be created for communication directly between the sender application running on the computing device running the content presentation application and the receiver application (described below in connection with FIG. 10) running on the selected media receiving device. This channel can be used to send commands from the computing device running the sender application to the selected media receiver application running the receiver application, such as a command to present a selected media content item, a command to play the media content item, a command to pause the media content item, etc. A computing device running the sender application and a media receiving device are sometimes referred to herein as being paired devices when a channel has been established between them as described above. Additionally or alternatively, in some implementations, the sender application can send any suitable commands and/or instructions, such as commands and/or instructions to present particular content (e.g., content that is selected at 908) over the channel described above and/or using a non-persistent connection. For example, commands and/or instructions can be sent over a non-persistent connection by sending a request to the media receiving device using a transient channel (e.g., communicating using Hypertext Transfer Protocol messages addressed to the media receiving device). In some implementations, certain commands and/or instructions can be sent using a non-persistent connection during an initialization period of the media receiving device and/or when a receiver application of the media receiving device is launching, prior to the persistent connection being established, during initialization of the persistent communication channel, and/or at any other suitable timing.

In some implementations, when a channel is created between the computing device running the sender application and a media receiver device, the sender application can send instructions to launch a content streaming application that corresponds to the content presentation application that was used for discovering and/or browsing content at 904 and/or selecting content at 908.

At 916, the sender application can determine whether the source of the media content item is local (e.g., on the computing device running the sender application) or remote (e.g., on a content delivery server, on a network attached storage, on a personal computer on the network, etc.). If the sender application determines that the source of the media content item is remote ("REMOTE" at 916), process 900 can proceed to 918.

At 918, the sender application can cause the selected media receiving device to request the content item from the remote source from which the content item is available (e.g., a remote server, network attached storage, etc.) using any suitable communication protocols such as hypertext transfer protocol (HTTP), any suitable streaming protocol, file transfer protocol (FTP), protocols corresponding to Digital Living Network Alliance (DLNA) standards, or any other suitable protocol. In some implementations, if the media content item was presented by the computing device running the content presentation application the media receiver application can cause the media content item to be presented where the computing device left off presenting the media content item.

Otherwise, if the sender application determines that the source of the media content item is local ("LOCAL" at 916), process 900 can proceed to 920.

At 920, the sender application can cause the computing device running the content presentation application to transmit the content to the selected media receiving device over the network. The sender application can then cause the selected media receiving device to present the content, using a channel established between the computing device running the sender application and the selected media receiver device. In some implementations, a channel for sending the content from the device executing process 900 (e.g., computing device 112) to the selected media receiving device (e.g., media receiving device 102) can be a separate channel than a channel for sending commands and/or instructions to media receiving device 112. For example, a channel for sending commands and/or instructions can be a control channel, and a channel for sending content can be a data channel. Alternatively, content can be sent over the same channel as commands and/or instructions.

In some implementations, the media content item can include a Web page or portion of a Web page being rendered by computing device 112. In such implementations, the Web page can be considered to be a locally stored media content item and can be transmitted directly from computing device 112 to media receiver 102 (e.g., over a network such as a home network) as a video object (e.g., the Web page can be rendered by computing device 112 and a video corresponding to the content can be transmitted to media receiver 102). Alternatively, the Web page can be considered to be a remote media content item and can be requested by media receiving device 102 and rendered using, for example, a web browser application launched by media receiving device 102.

Figure 10:
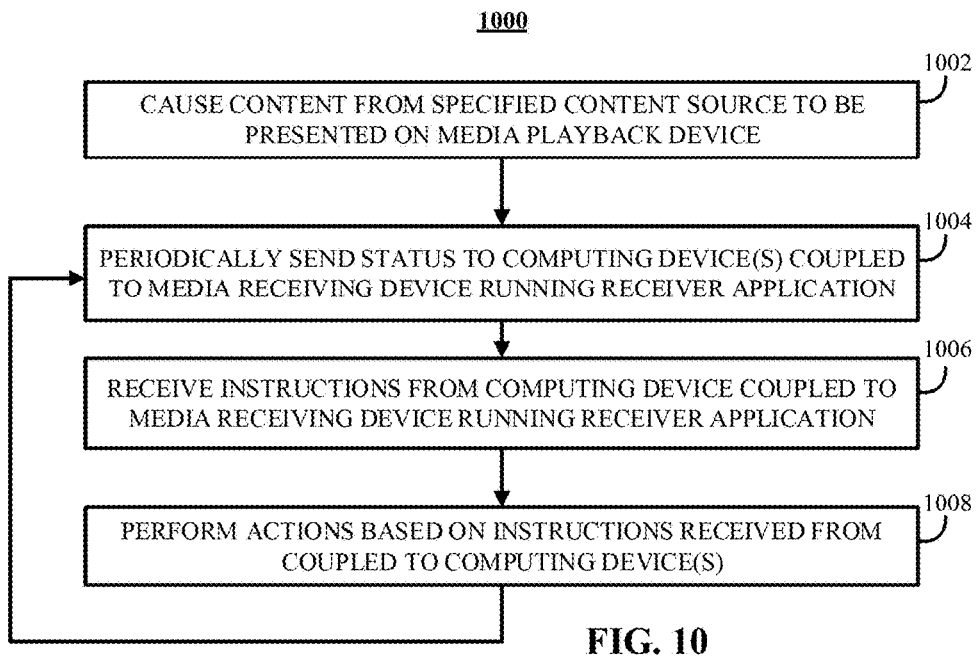
FIG. 10 shows an example of a process for receiving and presenting media content using a media receiving device in accordance with some implementations of the disclosed subject matter.

FIG. 10 shows an example 1000 of a process for receiving and presenting media content using a media receiving device running a receiver application. As described above, a media receiving device (e.g., media receiving device 102) can run a receiver application for receiving requests and commands from computing devices that are running a sender application. When a discovery request is received from a sender application, the receiver application can cause the media receiving device to respond to the discovery request and establish a control and/or data channel with the computing device that sent the discovery request in response to the sender application indicating that a channel is to be established.

In some implementations, the receiver application can be an application programming interface (API) for communication with the sender application as described above. Such a receiver application can be executed by a media receiving device (e.g., media receiving device 102) to receive commands from a sender application running on a computing device, such as computing device 112. Among other things, the receiver application can perform the following functions: respond to discovery requests sent by a computing device running the sender application; establish one or more communication channels with the computing device to be able to send and/or receive communications; download and/or launch a streaming application for presenting content; and relay instructions received over the one or more communication channels to a streaming application being used by the media receiving device to present a media content item.

In some implementations, the receiver application can include a set of standard software instructions, such as one or more portions of a software developer kit (SDK) (e.g., a Content Receiver SDK) for performing the above functions. The receiver application can, for example, launch a listener for receiving discovery requests from computing devices (e.g., computing device 112) running the sender application, create a persistent connection with the computing device for sending and receiving commands and/or messages, download and render a streaming application, receive commands from the computing device running the sender application, and relay the command to the streaming application (e.g., in a default format or in a format particular to the source of content associated with the streaming application). Additionally, the receiver application can periodically send status updates from the media receiving device regarding, e.g., whether a media content item is being played, an identity of the media content item, a time of the media content item, etc. In some implementations, commands specific to a particular content presentation application and/or content streaming application can be sent and/or received by the receiver application. Such application specific commands can be relayed from the content presentation application to the streaming application via the sender application and receiving application, and vice versa. For example, a streaming application that requires an authentication token to receive and present a media content item can request such an authentication token from the content presentation application through the receiver application and the sender application.

In some implementations, the receiver application can start in response to the media receiving device being initiated (e.g., powering on). Additionally, the receiver application can run as a background application and/or start in response to a listener application running on the media receiving device receiving a discovery request from a sender application.

In some implementations, the media receiving device running the receiver application can receive instructions to launch a content streaming application that corresponds to the content presentation application running on the computing device running the sender application. Such instructions can include address information (e.g., a URI, a URL, a URN, an IP address, and/or any other suitable address information) where the content streaming application can be downloaded, software corresponding to the content streaming application, an indication of a pre-installed content streaming application to launch, or any other suitable instructions to launch the content streaming application.

In some implementations, the receiver application can cause the media receiving device to download the content streaming application from the received address. The content streaming application can then be rendered by the media receiving application in order to render a content item (e.g., a content item selected at 908). The content streaming application can include any suitable software for causing the media receiving device to present a content item on a connected media playback device. For example, the streaming application can include hypertext markup language (HTML), JavaScript (JS), or any other suitable programming language.

In some implementations, when the receiver application launches a content streaming application, the receiver application can cause an application context to be created. For example, an application context identified as "Fling" can be created as an origin for messages to be received from the receiver application by the content streaming application. In some implementations, when a content streaming application is done being rendered, the receiver application can set any suitable target for commands that are received from the sender application. For example, the receiver application can set a video tag of the content streaming application as a target for commands that are received from the sender application. As another example, the receiver application can set a video element of the content streaming application as a target for commands that are received from the sender application. These commands can then be executed by the media receiving device upon receiving the command from a sender application. Additionally or alternatively, a destination for commands received from the sender can be set to a particular event handler, which can receive the commands and determine how to properly respond to the received command.

At 1002, the media receiving device running the receiver application (e.g., media receiving device 102) can cause content specified by a sender application to be presented on a media playback device (e.g., media playback device 106) after a streaming application has been launched. The content can be requested from a particular address specified by the sender application and/or can be received from the computing device running the sender application.

At 1004, the media receiving device running the receiver application can periodically send a status to any computing devices with which a channel has been established. Such a status can include, for example, a play/pause state, a completion percentage of the media content item, metadata related to the media content item being presented, and/or any other suitable information.

At 1006, the media receiving device running the receiver application can receive instructions from computing devices that are coupled to the media receiving application. For example, instructions can include a play command, a pause command, a volume command, etc.

At 1008, the media receiving device running the receiver application can perform actions based on instructions received from a coupled device. For example, the media receiving device can instruct the streaming application that is causing a media content item to be presented to pause presentation of the media content item in response to receiving a pause command. After any actions are performed at 1008, process 1000 can return to 1004 and continue to send status updates. In some implementations, the computing device running the sender application can send a request for a status update, and the receiver application can cause a status update to be sent asynchronously (e.g., not corresponding to a particular period, a status update can be sent whenever a command from among a predetermined subset of commands is received, etc.).

In some implementation, the media receiving device can be configured to support a single concurrent media stream playback. For example, a document object model (DOM) running on the media receiving device can be configured such that only one active video element can be created and/or executed at any given time.

In some implementations, the media receiving device can be configured to present media content that is received in one of a predetermined subset of formats. Any suitable video and/or audio formats can be used, which can include any suitable video and/or audio encoding and/or decoding protocols, code, software, etc. For example, the media receiving device can support a predetermined subset of digital rights management (DRM) formats, such as Widevine, Playready, or any other suitable DRM format. As another example, the media receiving device can support a predetermined subset of video formats, such as VP8, or any other suitable video format. As yet another example, the media receiving device can support a predetermined subset of audio formats, such as MP3, CELT/OPUS, or any other suitable audio format. As still another example, the media receiving device can support a predetermined subset of audio-video formats (e.g., container formats) such as MP4, fragmented MP4 (fMP4), WebM, or any other suitable audio-video format. As a further example, the media receiving device can support a predetermined subset of media streaming formats, such as adaptive bitrate streaming based on any suitable streaming technique(s), or any other suitable media streaming format. In some implementations, audio and/or video received by the media receiving device can be encrypted using any suitable encryption technique(s). For example, the audio and/or video received by the media receiving device can be encrypted using the Common Encryption Scheme (CENC), or any other suitable encryption scheme.

In some implementations, commands sent by the sender application can include:

LOAD

In some implementations, a LOAD command can include fields for "source" which can contain a <content id>, a field for "title", a Boolean (e.g., true/false) field for "autoplay", a "content_info" field, and/or any other suitable field. This command can be used to load new content into the media player. The <content id> can contain an identity of the media to be loaded, which can have any suitable format. For example, <content id> can include a uniform resource identifier (URI), a uniform resource locator (URL), a uniform resource name (URN), an IP address, and/or any other suitable information for specifying a particular source of content and/or item of content. In some implementations, the <content id> can include identifying information of a source and/or identifying information of a media content item available from the source. The format of this field can be defined by the content presentation application, the content streaming application, a media player, and/or using any other suitable technique(s).

If the autoplay field is specified as "true" in LOAD, the content streaming application can begin playing the content when it is loaded. In some implementations, even if autoplay is not specified, the media streaming application can be configured to begin playback immediately. If playback is started, a player state in a status message can be set to "PLAYING," otherwise it can be set to "STOPPED."

The title field can optionally provide a user readable descriptive string for the content being loaded. If provided, the string can be used by the content streaming application as an initial value for the title field of each STATUS object sent from the content streaming application and/or receiver application. Whether or not the title is provided in the LOAD message, the content streaming application can modify the title field at any point based on the implementation of the content streaming application.

The content_info field can contain a JSON object which can give more in-depth information about the content being loaded, e.g. an identification of a TV service, an episode number, etc. If provided, the content_info object can be used as the initial value of the content_info field of each STATUS message (described below). The content streaming application and/or receiver application can modify the content_info at any point, based on, for example, metadata received with a media content item to be presented.

PLAY

In some implementations, a PLAY command can cause playback of the content that was loaded with the load call to be started and/or can change the playback position of currently loaded content. The PLAY command can include a position field, which can be given in seconds and can specify a position in the current content from which to start playback. If a position is not specified, playback can be continued from the current position. If a position that is provided is outside the range of valid positions of the current content, then the content streaming application can determine a valid position as close to the requested position as possible. In some implementations, when a PLAY command is received, a STATUS message can be sent to paired computing devices by the receiver application.

STOP

In some implementations, a STOP command can cause playback of the content to be halted. In some implementations, when a STOP command is received, a STATUS message can be sent to paired computing devices by the receiver application.

VOLUME

In some implementations, a VOLUME message can cause a volume output by the media receiving device (e.g., media receiving device 102) to be adjusted, and/or can cause a command to be issued to a media playback device connected to the media streaming device to change the volume output by the media playback device. A VOLUME message can include a field for a volume to be set. Such a field can be given as a number in a predetermined range, such as 0.0 to 1.0, where each decimal value can correspond to a particular volume. Additionally, in some implementations, a VOLUME message can include a muted field for specifying that the volume is to be muted or unmuted (e.g., based on a current state of the volume). In some implementations, the muted field can be a Boolean flag that if true can cause the volume to be muted if not currently muted, and unmuted if currently muted, and if false can cause no action to be taken with regard to a current mute status.

STATUS

A STATUS message can be sent from the content streaming application and/or the receiver application running on the media receiving application to the sender application and/or the content presentation application running on a paired computing device. This status message can contain status information related to the status of the content streaming application and/or content currently being presented by the content streaming application. Such status information can include a status object.

In some implementations, a status object can include fields for "event_sequence", "state", "active_input", "content_id", "title", "time_progress", "current_time", "duration", "volume", "content_info", "identity", "error" and any other suitable fields.

In some implementations, "event_sequence" can include a sequence number that can be used to identify a relative position of status events received in response to operations (e.g., LOAD, PLAY, etc.), and those received from unsolicited status updates (e.g., periodic updates). When a status event is received in response to an operation, any status event received with a sequence number less than that of the response can be ignored. Additionally, player status messages can be delivered on a separate channel than a channel used to send and/or receive commands. Thus event_sequence can become out of order relative to commands.

In some implementations, "state" can include a current state of the content and/or content streaming application. In some implementations, this can be represented by an integer from zero to two, such that: 0 corresponds to IDLE, 1 corresponds to STOPPED, and 2 corresponds to PLAYING. In some implementations, if "state" corresponds to IDLE, all fields except "sequence_number" and "error" can be ignored.

In some implementations, "active_input" can be a Boolean (e.g., true/false) field for indicating whether content that is being output by the device executing the content streaming application is being presented by a display coupled to the device executing the content streaming application. For example, "active_input" can indicate whether an HDMI input port of a television to which the device executing the content streaming application is coupled is the currently selected input of the television.

In some implementations, "content_id" can include a service-specific identifier of the content currently loaded by the content streaming application, which can be a free form string and can be specific to the content streaming application.

In some implementations, "title" can include a descriptive title of the content currently loaded by the content streaming application. In some implementations, the content streaming application can independently retrieve title information based on "content_id" or "title" given in a LOAD message.

In some implementations, "time_progress" can include an indication of whether the media time of the currently loaded content is progressing. In some implementations, if the value of "time_progress" is false, the computing device running the sender application can be instructed to stop extrapolating the media time. In some implementations, "time_progress" can be independent of "state" as the media time can stop in any state (e.g., due to an error, due to buffering, etc.).

In some implementations, "current_time" can include a current position of the content streaming application with respect to a beginning of the content, which can be given in seconds. If the content is live stream content, "current_time" can represent the time in seconds from the beginning of the live stream.

In some implementations, "duration" can include a representation of a duration of the currently playing content, which can be given in seconds. If the content is a live stream then this field can be set to null.

In some implementations, "volume" can include a current volume level, which can be indicated, for example, by a value between 0.0 and 1.0.

In some implementations, "content_info" can include a service specific object which can provide in-depth information about the current content. In some implementations, an initial value of "content_info" can be provided by the sender application in a LOAD message. In some implementations, the content streaming application can modify the content of "content_info" to provide information obtained by the content streaming application.

In some implementations, "identity" can include an automatically identified authentication token. This can be used when communication with external systems, such as a service provider content delivery network, a digital rights management server, and/or any other suitable outside system is performed. The authentication token can be used to identify the media receiving device running the receiver application when communicating with outside systems rather than an operating system identification or device identification token, which can, for example, enhance a privacy and security of the digital receiving device.

In some implementations, "error" can include a last error encountered by the media receiving device. If no error have been encountered, "error" can be set to null. Additionally, "error" can include an "Error Domain" that can be used to provide errors corresponding to individual applications, such as the receiver application, a content streaming application, etc.

In some implementations, multiple computing devices 112 can be used to send content to a common media playback device using the same or different content presentation applications. In such an implementation, media receiving device 102 can be configured to interrupt content that is currently being presented, add newly sent content to a queue to be presented after presentation of the content that is currently being presented, return a message indicating that display of the content has been inhibited, or any other suitable technique(s) for determining which content to present. In some implementations, settings of a content streaming application running on media receiving device 102 can determine whether to interrupt the currently presented content, add the new content item to a queue, refuse to accept the new content item, or any other technique(s) for determining which content to present.

Figure 11:
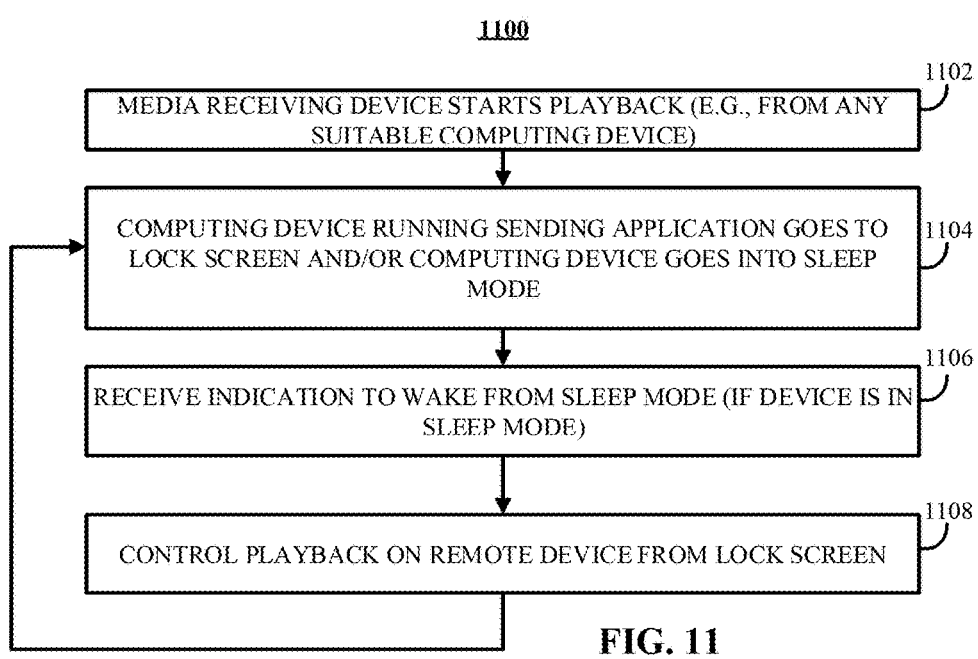
FIG. 11 shows an example of a process for generating commands to be sent to a media receiving device from a lock screen of a computing device in accordance with some implementations of the disclosed subject matter.

FIG. 11 shows an example 1100 of a process for generating commands to be sent to a media receiving device from a lock screen of a computing device running the sender application in accordance with some implementations of the disclosed subject matter. At 1102, a media receiving device (e.g., media receiving device 102) can cause content to be presented by starting playback of the content in response to a suitable command from a computing device (e.g., computing device 112).

At 1104, computing device 112 running the sending application can go to a lock screen of the computing device, which can be a screen where a user has to perform an action to "unlock" the computing device prior to accessing some of the features of the computing device. Additionally or alternatively, computing device 112 can go into a "sleep mode" where the computing device can enter into a low power state (e.g., by turning off a display). In some implementations, a computing device can wake from a sleep mode in response to certain events such as receiving a message (e.g., a phone call, a text message, etc.), a particular user input (e.g., a button press on a particular button, a particular movement of the computing device by the user, etc.), and/or any other suitable event.

At 1106, if computing device 112 is in a sleep mode, computing device 106 can receive an indication to wake from sleep mode, as described above.

At 1108, computing device 112 can receive user inputs and the sender application can generate commands to send to media receiving device 102 in response to user inputs.

In some implementations, a second computing device that is not the same as a computing device that caused media content to be presented using a media receiving device can be coupled to the media receiving device and can control presentation of content on the media receiving device. For example, a second computing device can be coupled to a media receiving device that is being used to present content on a media playback device by selecting an icon for pairing with a media receiving device. A particular device can be chosen, and if the second computing device meets specified criterion (e.g., is on the same network, is allowed to be coupled to the media receiving device, the media receiving device is configured to accept control from multiple computing devices, etc.), the second computing device can be coupled and can control presentation of media content on the media receiving device.

In some implementations, a second computing device coupled to the media receiving device can be used to control certain properties of the presentation of the media content, for example, from a lock screen. Additionally, a second computing device that does not have the particular content presentation application used to present the content item can nevertheless be used to control aspects of the presentation of the content item, such as play/pause, volume, seek, etc., but may be inhibited from discovering and/or browsing for additional media content items.

Figure 12A:
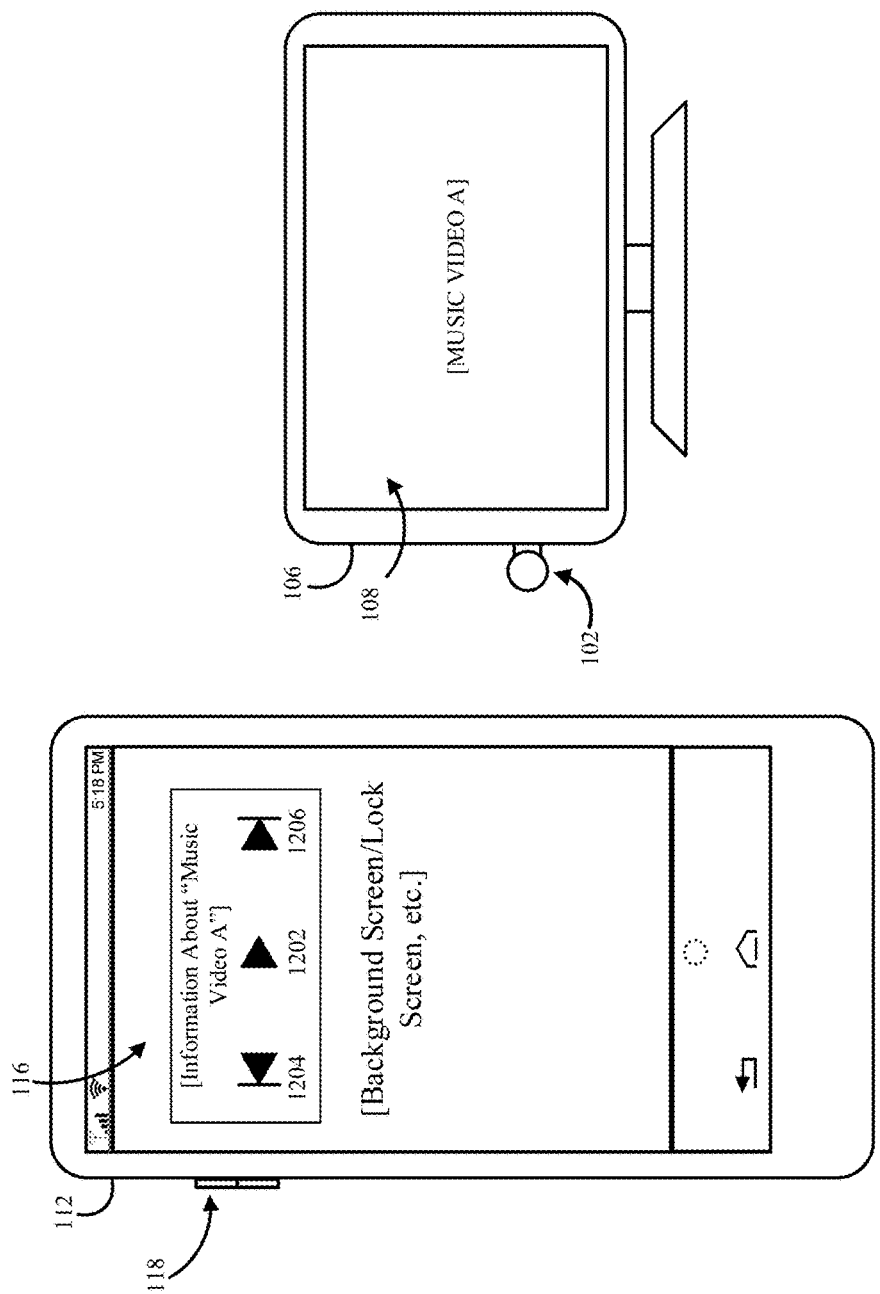
FIGS. 12A-12B show examples of a lock screen user interface for controlling a media receiving device in accordance with some implementations of the disclosed subject matter.

FIG. 12A shows an example of a lock screen user interface in accordance with some implementations. In the example shown in FIG. 12A computing device 112 has caused media receiving device 102 to present a media content item to be presented on display 108 of media playback device 106. In some implementations, in a lock screen of computing device 112 running the sending application, information can be presented to the user regarding identification of media content being presented, which can include title information, episode information, etc. The lock screen can also include controls 1202-1206 for controlling playback of the media content item on media playback device 106. For example, the lock screen can contain a play icon 1202 which can be used to control whether to play or pause (or stop) presentation of the media content item, a seek back or previous track icon 1204 and a seek forward or next track icon 1206 which can be used to control such behavior. In some implementations, if computing device 112 detects a user input to one of controls 1202-1206, the sender application can formulate a corresponding command which can be sent over the channel established between computing device 112 and media receiving device 102. Media receiving device 102 can receive the command using the receiver application and the content streaming application that is causing content to be presented can control presentation of the content in response to the received command.

In some implementations, the lock screen can include other user interface items and/or information, such as a scrubber (e.g., a bar indicating a progress time of the media content) which can be used to play the media content from a particular location, a preview function which can present a user with a screen shot of the content at a time indicated by user selection of a particular time using the scrubber, an identification of the media receiving device that is being used to present the content identified by the title presented on the lock screen, and/or any other suitable information or interface items.

Figure 12B:
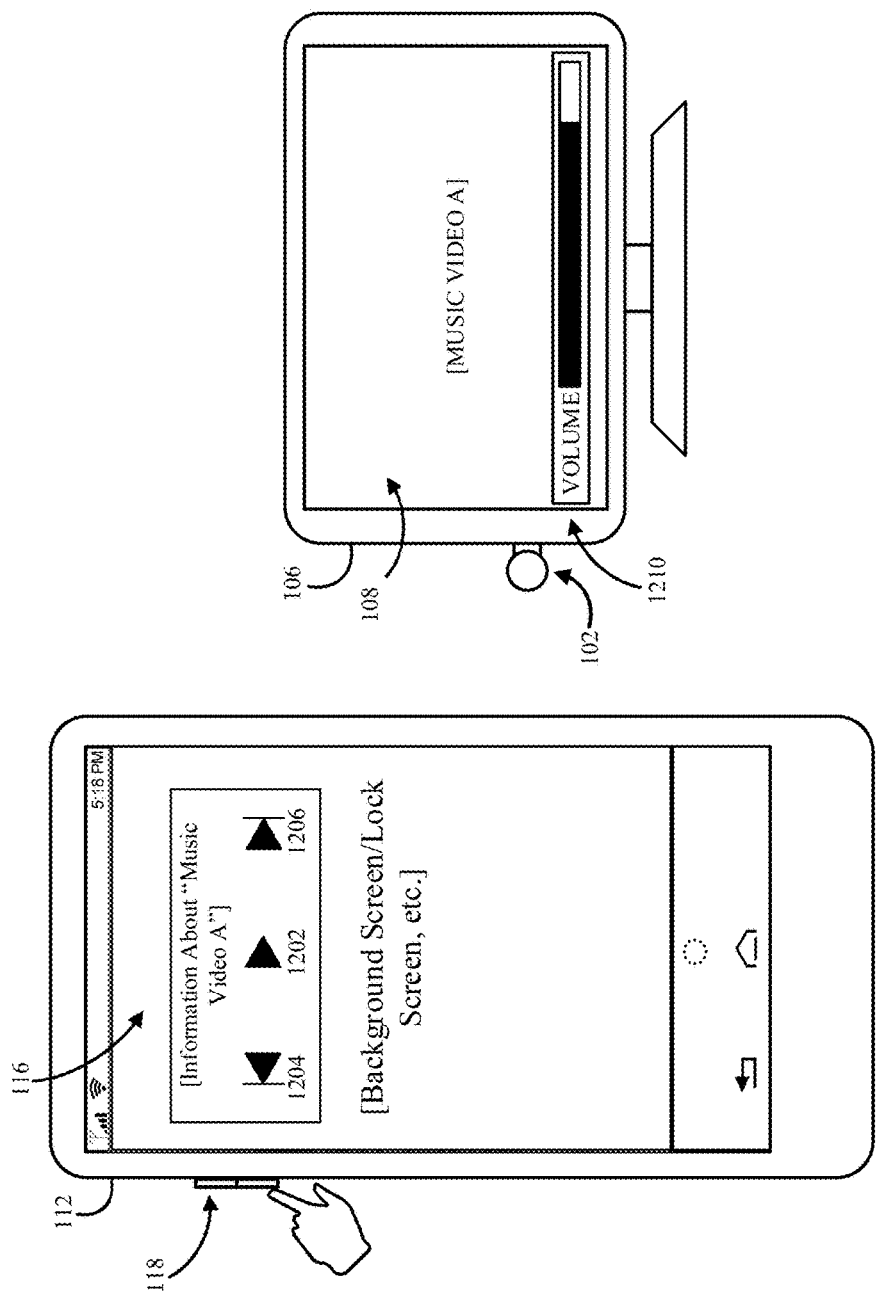

FIG. 12B shows an example of control of volume from a lock screen of a computing device in accordance with some implementations of the disclosed subject matter. In the example shown in FIG. 12B, computing device 112 in a lock screen can detect activation of volume control 118, for example in response to a user pressing volume control 118. In some implementations, in response to computing device 112 detecting activation of volume control 118 in a lock screen during presentation of media content using media receiving device 102, the sender application can send a command to change the volume to media receiving device as a VOLUME command. The specified volume can change a predetermined amount for each activation of volume control 118 (e.g., volume can be changed by 0.1 for each press). In some implementations, media receiving device 102 can cause an output volume to be changed in response to the receiver application receiving the VOLUME command, and can cause a current volume 1210 to be presented on display 108 of media playback device 106.

Figure 13:
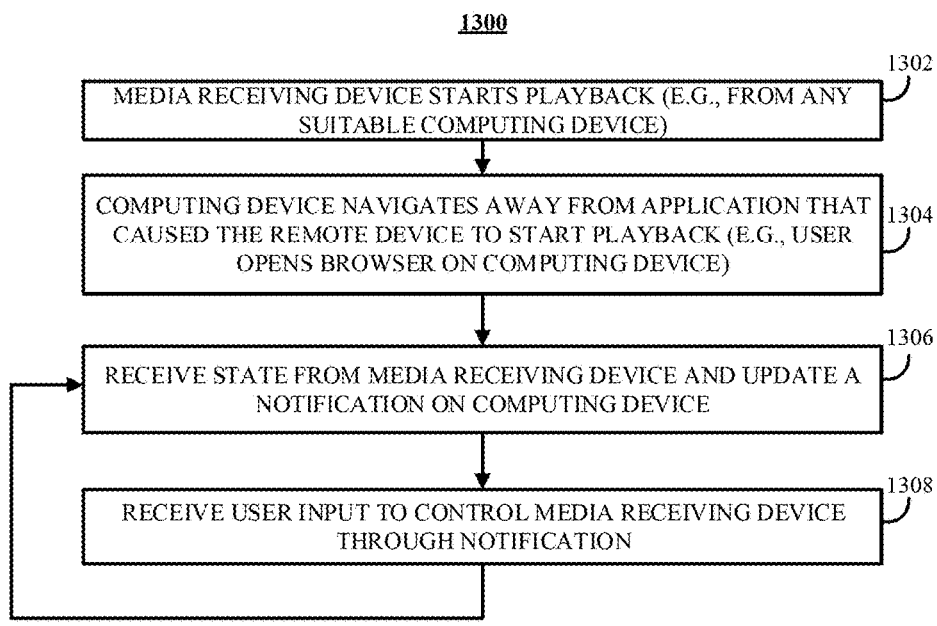
FIG. 13 shows an example of a process for controlling presentation of a media content item from a notification provided on a computing device in accordance with some implementations of the disclosed subject matter.

FIG. 13 shows an example 1300 of a process for controlling presentation of a media content item from a notification provided on a computing device in accordance with some implementations of the disclosed subject matter. At 1302, a media receiving device (e.g., media receiving device 102) can cause content to be presented by starting playback of the content in response to a suitable command from a computing device (e.g., computing device 112).

At 1304, computing device 112 that caused the content to be presented can navigate away from the content presentation application that was used to initiate presentation of the content. For example, a Web browser application may be opened by computing device 112 in response to a user instructing computing device 112 to open the Web browser application. As another example, the content presentation application can be minimized or put into a background mode in response to a user navigating to a home screen of computing device 112.

At 1306, the sender application running on computing device 112 can receive a state of content being presented using media receiving device 102. In response to receiving the status of the content, the sender application and/or the content presentation application which can be running, for example, in a background state, can create and/or update a notification related to the state of the content. In some implementations, computing device 112 can place such a notification in a notification center or notification page which can be accessed by receiving a predetermined input.

At 1308, computing device 112 can receive an input to control presentation of the content through the notification that was created and/or updated at 1306. For example, computing device can open a notification page in response to receiving the predetermined input and can receive further input corresponding to a particular command. More particularly, an input can be received that can correspond to a pause command, and the sender application can generate a pause command in response to receiving such an input at the notification. As another example, an input can be received that can correspond to an instruction to open the content presentation application.

FIGS. 14A-14F show an example of using the mechanisms described herein for presenting content used with computing device 112, which can include at least a portion of each of process 900 and process 1100 in accordance with some implementations of the disclosed subject matter.

Figure 14A:
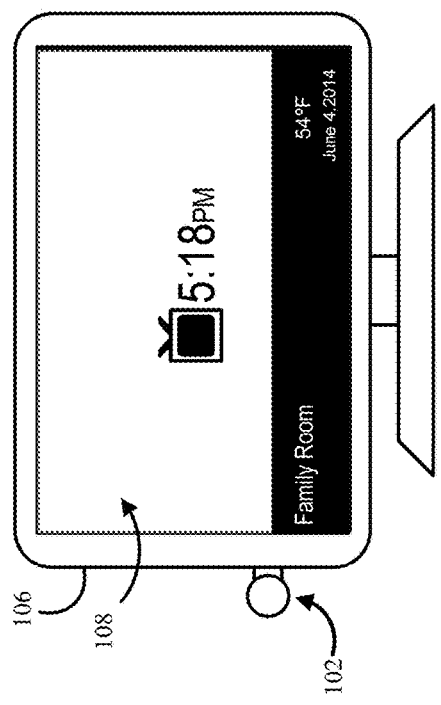
FIGS. 14A-14F show an example of using the mechanisms described herein for presenting content used with a computing device in accordance with some implementations of the disclosed subject matter.
Figure 14A:
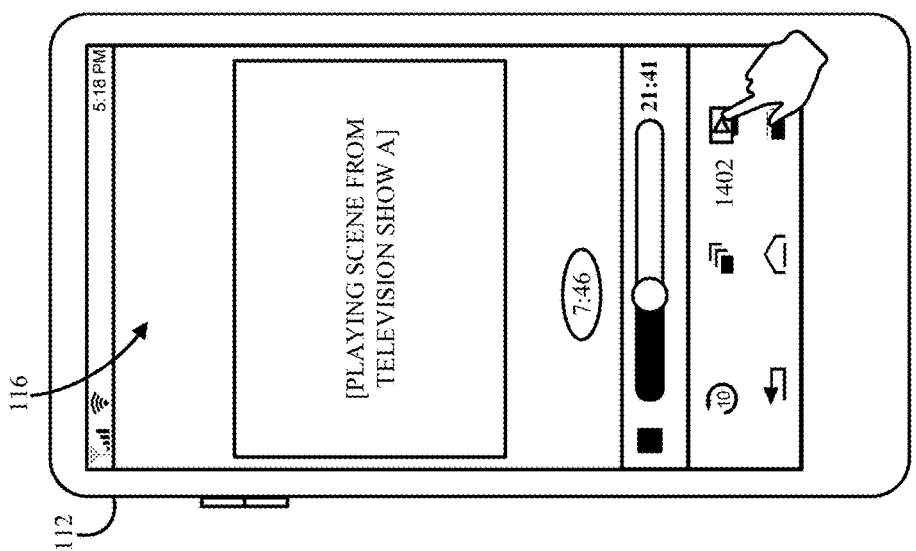

FIG. 14A shows an example of computing device 112 being used to present a media content item using display 116. In the example shown in FIG. 14A, the media content item can be an episode of a television series being presented using a content presentation application that allows a user to access a service that facilitates streaming of movies and television shows for playback on various devices. A user interface of the content presentation application can include an icon 1402 that causes a sender application and/or the content presentation application running on computing device 112 to initiate mechanisms for causing the content being presented on display 116 to be presented using a media receiving device, such as media receiving device 102. In some implementations, if an input corresponding to media receiving device 102 (e.g., the HDMI port that media receiving device is plugged into) is selected on media playback device 106 while a content item is not being presented by media receiving device 102, a default screen can be presented by media receiving device 102.

Figure 14B:
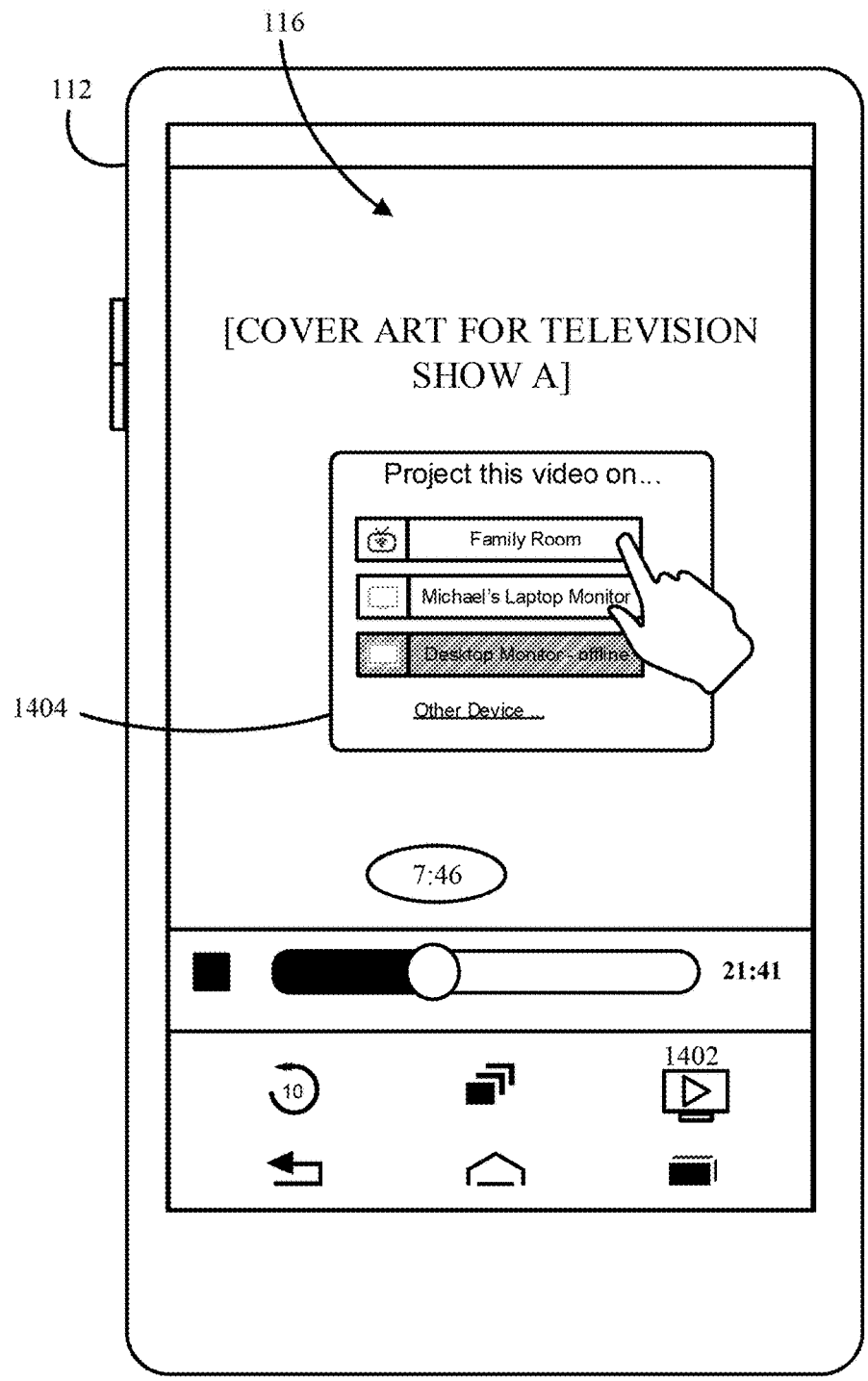

FIG. 14B shows an example of a user interface that can be presented by the sender application in response to computing device 112 receiving an input corresponding to a selection of icon 1402. In the example shown in FIG. 14B, the sender application can present a list 1404 of media receiver devices which can cause the selected media content item (e.g., the television show being presented on display 116 in FIG. 14A) to be presented. In some implementations, when list 1404 is presented, playback of the media content item can be paused or otherwise inhibited pending a user selection. Alternatively, list 1404 can be presented during playback of the media content item by computing device 112.

Figure 14C:
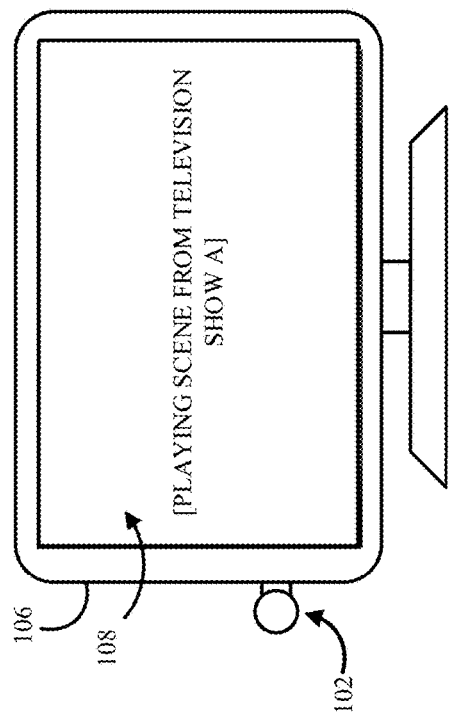
Figure 14C:
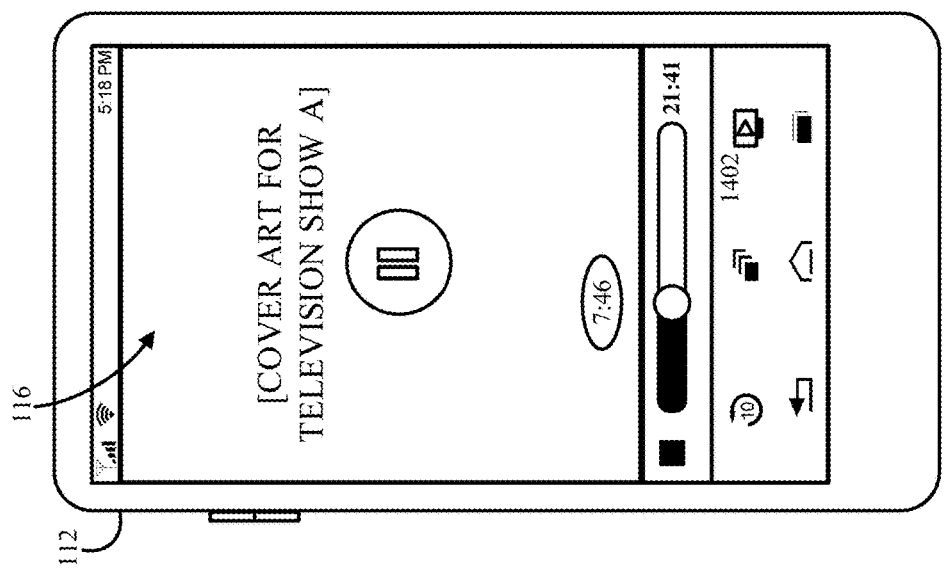

FIG. 14C shows an example of the media content item being presented by media receiving device 102 on display 108 of media playback device 106, while the content presentation application is active on computing device 112. In some implementations, information related to the media content can be presented on computing device 112 while the content it being presented using media receiving device 102.

Figure 14D:
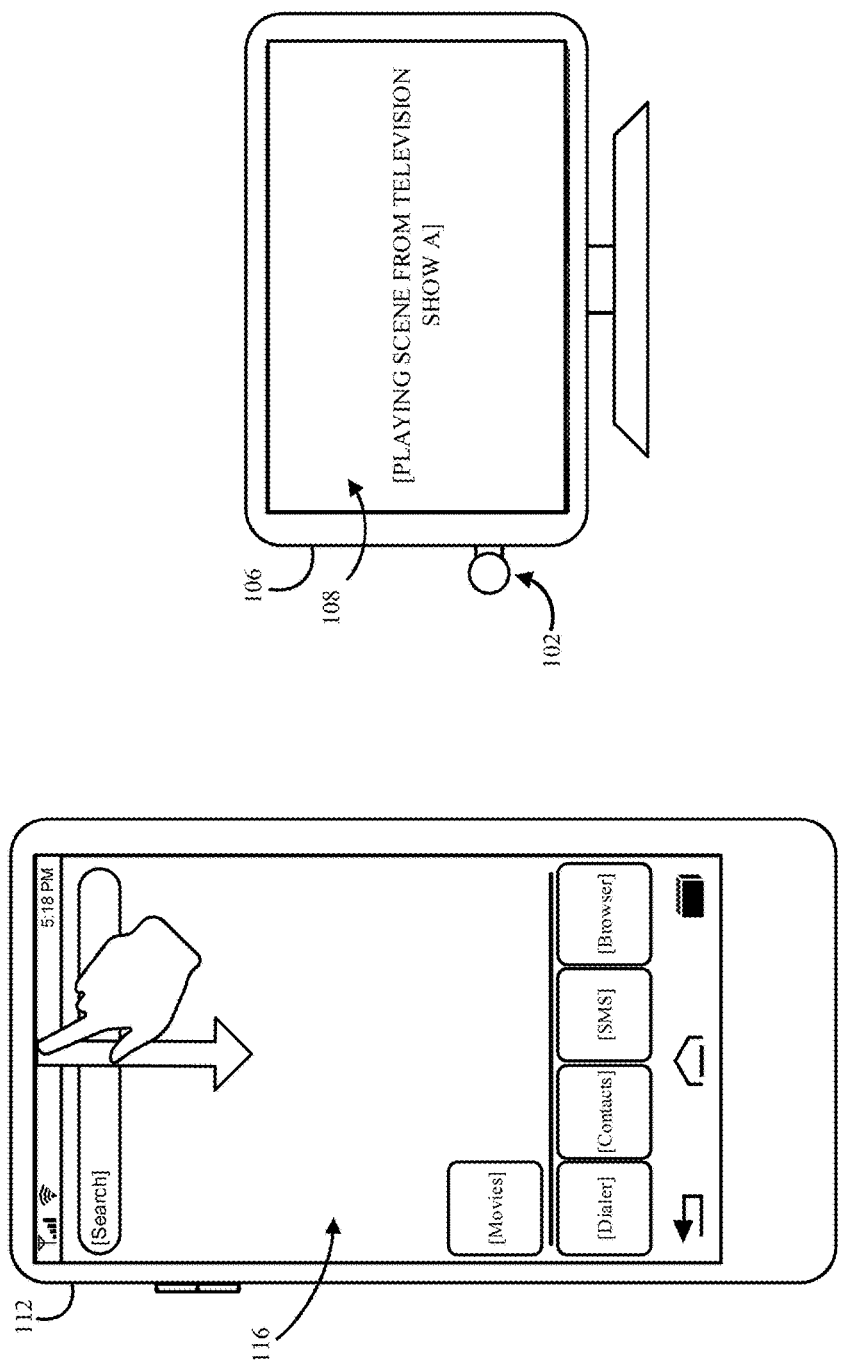

FIG. 14D shows an example of the media content item being presented by media receiving device 102 on display 108 of media playback device 106 while computing device 112 is at a home screen. In some implementations, a user can perform a predetermined action, such as a swipe from a top bezel of a touchscreen of computing device 112 to navigate to a notification screen.

Figure 14E:
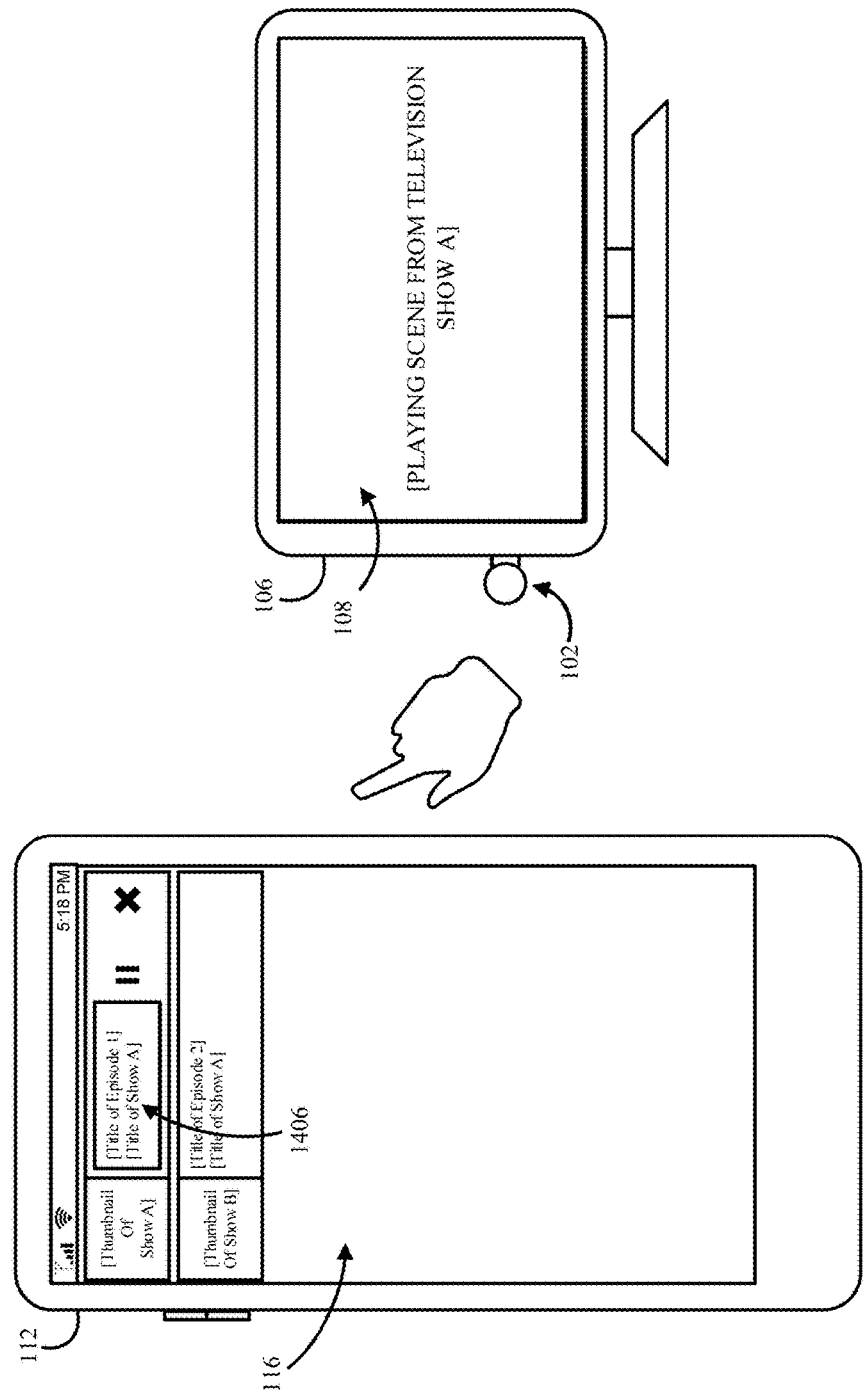

FIG. 14E shows an example of the media content item being presented by media receiving device 102 on display 108 of media playback device 106 while computing device 112 is at a notification screen. As described above in connection with FIG. 13, a notification 1406 can be created that corresponds to the media content item being presented using media receiving device 102, and notification 1406 can be used to control presentation of the media content by media receiving device 102, by for example, receiving an indication that a pause icon has been selected.

Figure 14F:
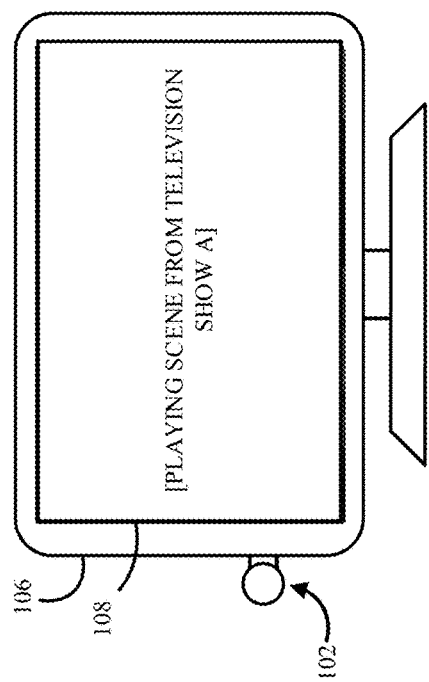
Figure 14F:
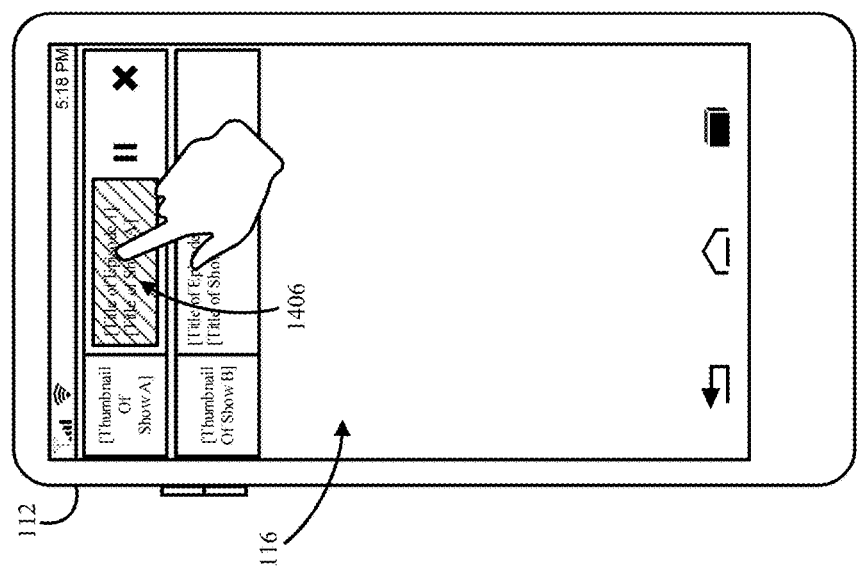

FIG. 14F shows an example in which a user is selecting an icon corresponding to the media content being displayed. Selection of such an icon can cause computing device 112 to navigate to the content presentation application, for example as shown in FIG. 14C.

In some implementations, information such as a show title, episode title, cover art, etc. can be displayed in such a notification as shown in, for example, FIGS. 14E and 14F.

FIGS. 15A-15E show an example of using the mechanisms described herein for presenting content used with a computing device running a browser that includes the sender application, which includes at least a portion of each of process 900 and process 1100 in accordance with some implementations of the disclosed subject matter.

Figure 15A:
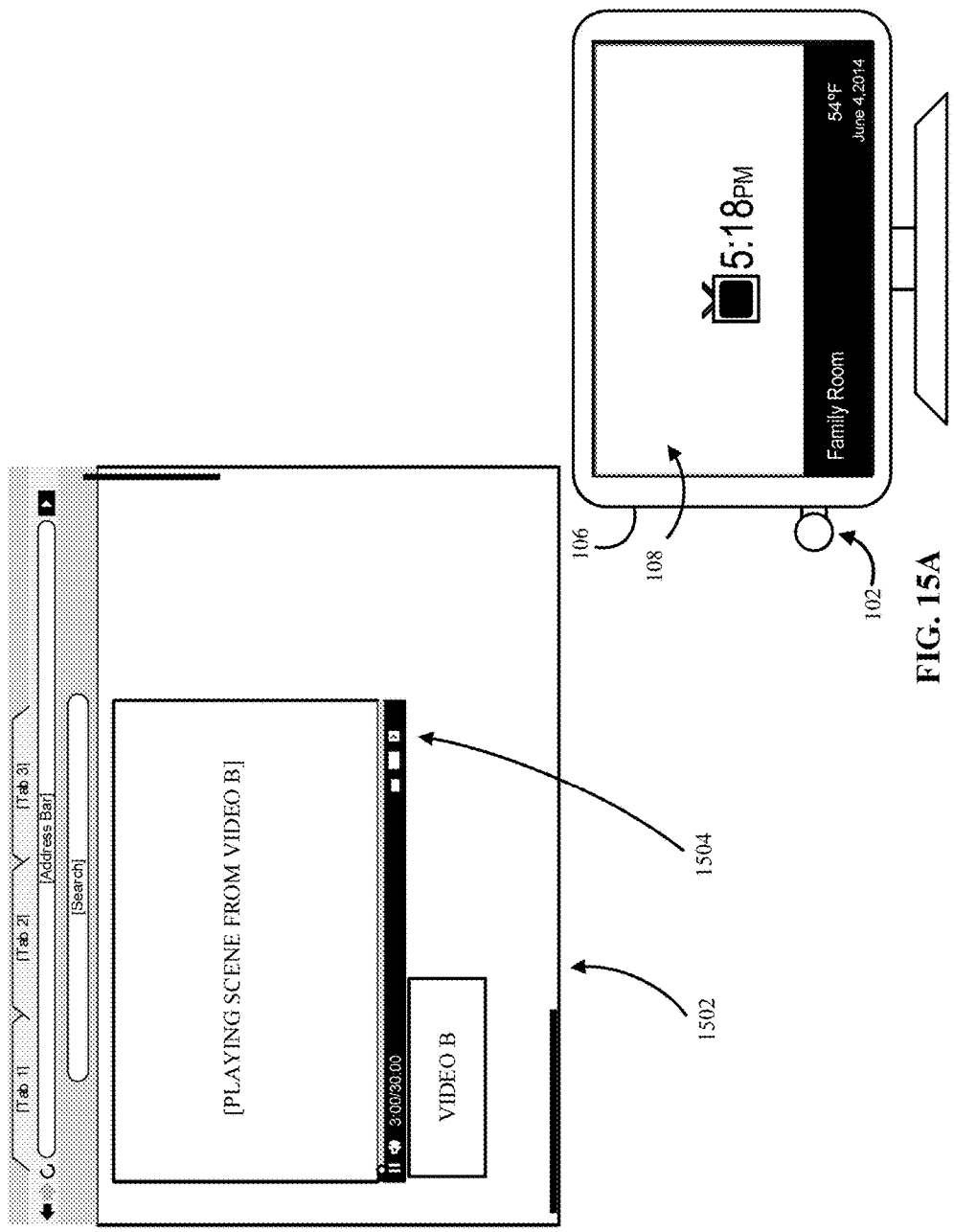
FIGS. 15A-15E show an example of using the mechanisms described herein for presenting content used with a computing device running a browser in accordance with some implementations of the disclosed subject matter.

FIG. 15A shows an example of a browser 1502 being used to present a media content item. In the example shown in FIG. 15A, the media content item can be a video available to users of a video sharing service presented using a Web page of the video sharing service that allows a user to access videos made available by the video sharing service. A user interface of the Web page can include an icon 1504 that causes a sender application and/or browser 1502 to initiate mechanisms for causing the content being presented in the Web page to be presented using a media receiving device, such as media receiving device 102. In some implementations, if an input corresponding to media receiving device 102 (e.g., the HDMI port that media receiving device is plugged into) is selected on media playback device 106 while a content item is not being presented by media receiving device 102, a default screen can be presented by media receiving device 102, as shown in FIG. 15A.

Figure 15B:
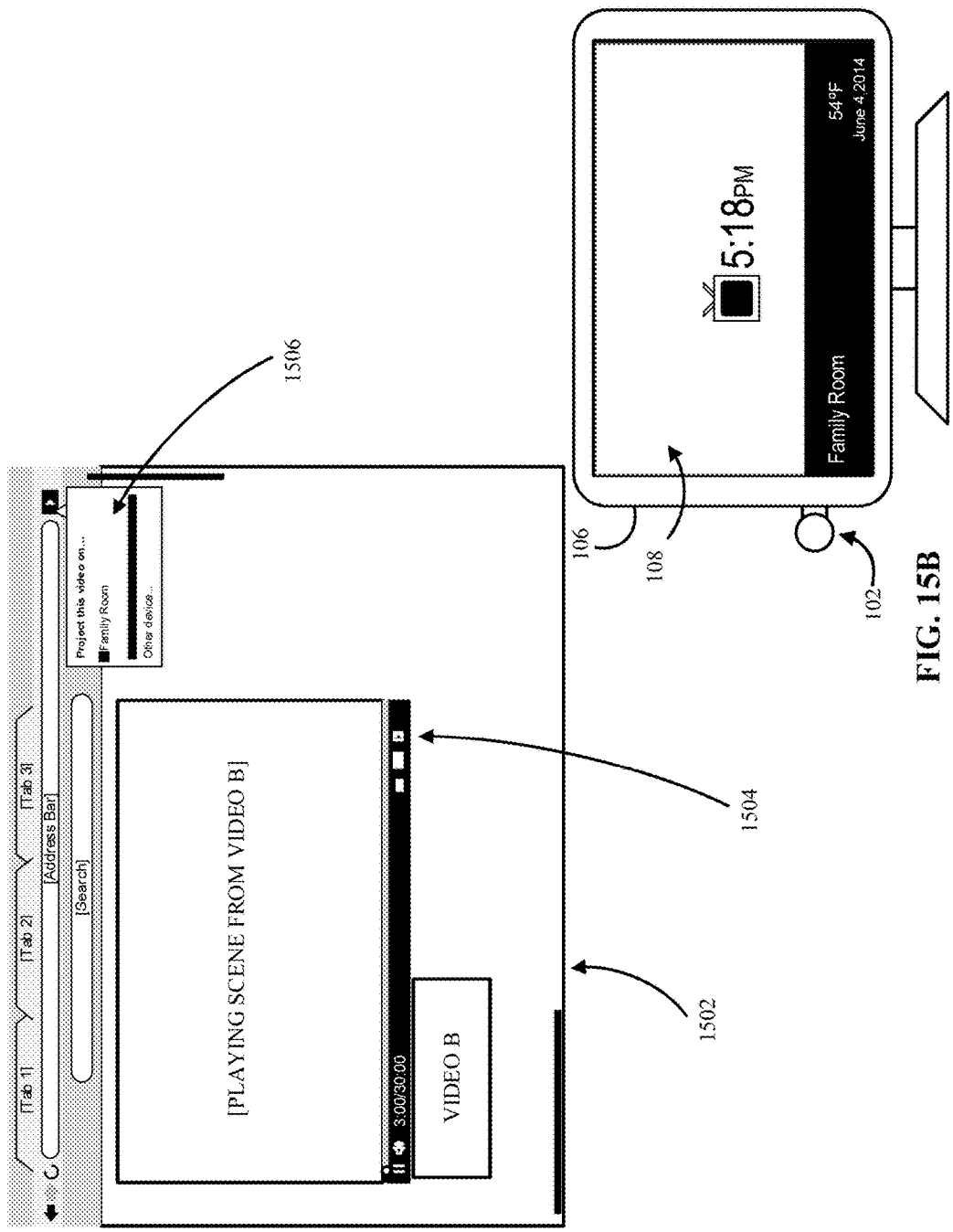
Figure 15C:
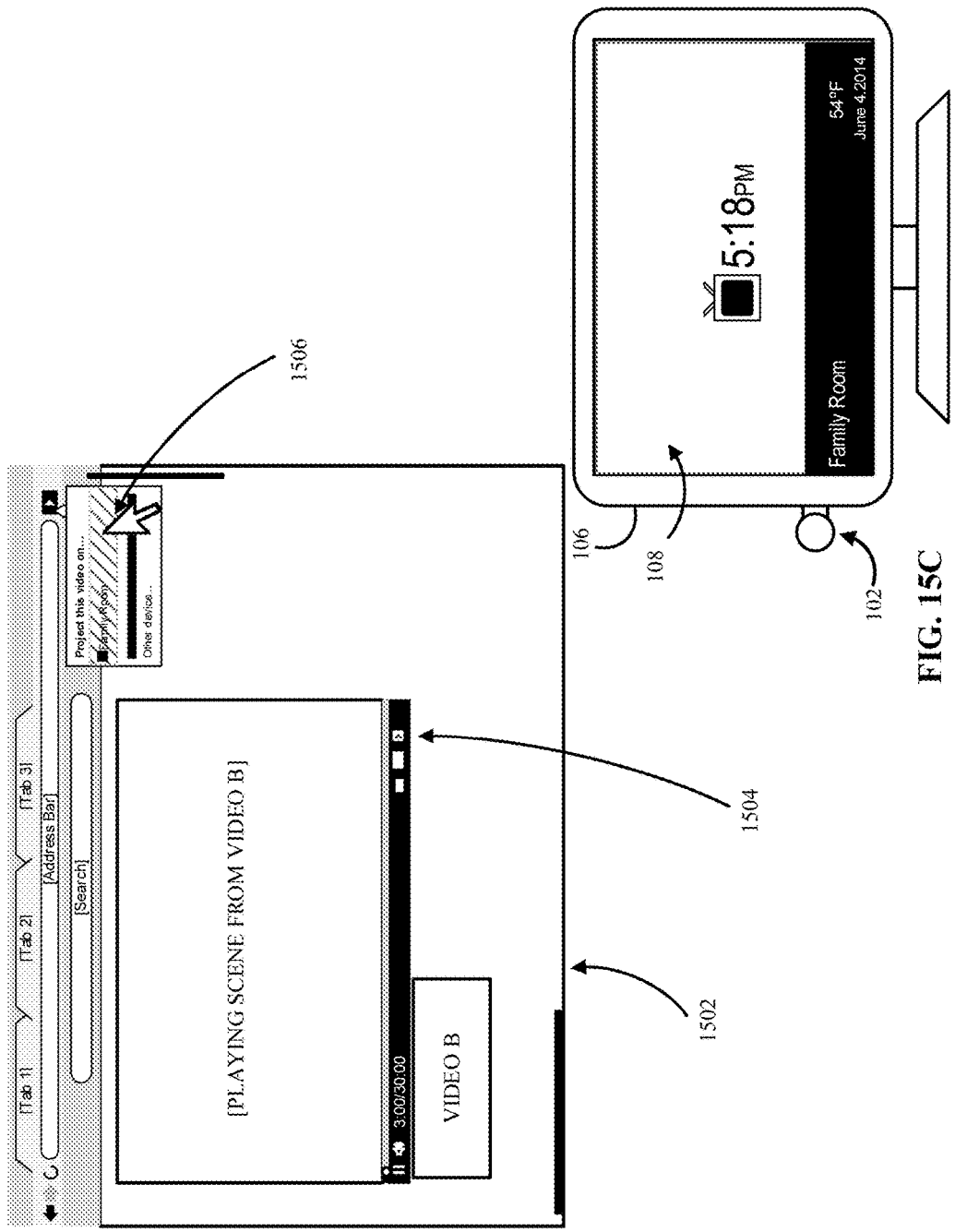

FIG. 15B shows an example of browser 802 after a selection of icon 804 is received, where a list 1506 of media receiver devices which can cause the selected media content item (e.g., the video being played in FIG. 15B) to be presented. Additionally or alternatively, in some implementations, list 1506 can be presented as a drop-down list from icon 1504 after selection of icon 1504, and/or list 1506 can be presented as a drop-down from the title bar (e.g., as shown in FIG. 15B) in response to selection of the icon in the title bar. In some implementations, FIG. 15C shows a cursor selecting a media receiving device in list 1506 that corresponds to media receiving device 102 connected to media playback device 106.

Figure 15D:
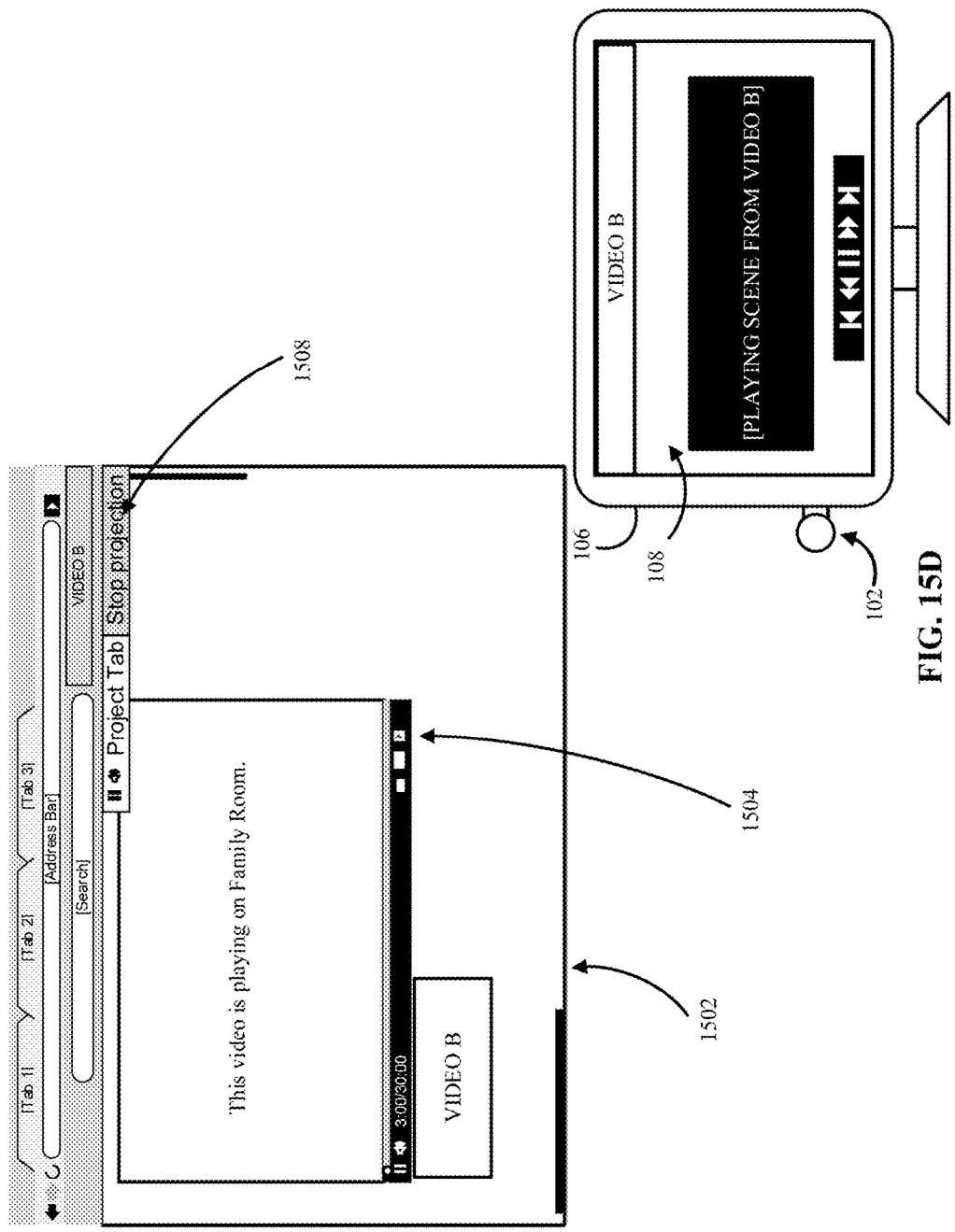

FIG. 15D shows an example of the video that was being presented in browser 1502 being presented by media receiving device 102 on display 108 of media playback device 106. In some implementations, when the media content item is being presented by media playback device 102 a message indicating such can be presented in place of the video in browser 1502. Additionally, controls 1508 for controlling presentation by media receiving device 102 can be presented to a user by browser 1502. In some implementations, when a media content item is initially presented by a media receiving application, e.g., on display 108, information identifying the media content item such as a title, etc., can be presented as an overlay or the like.

Figure 15E:
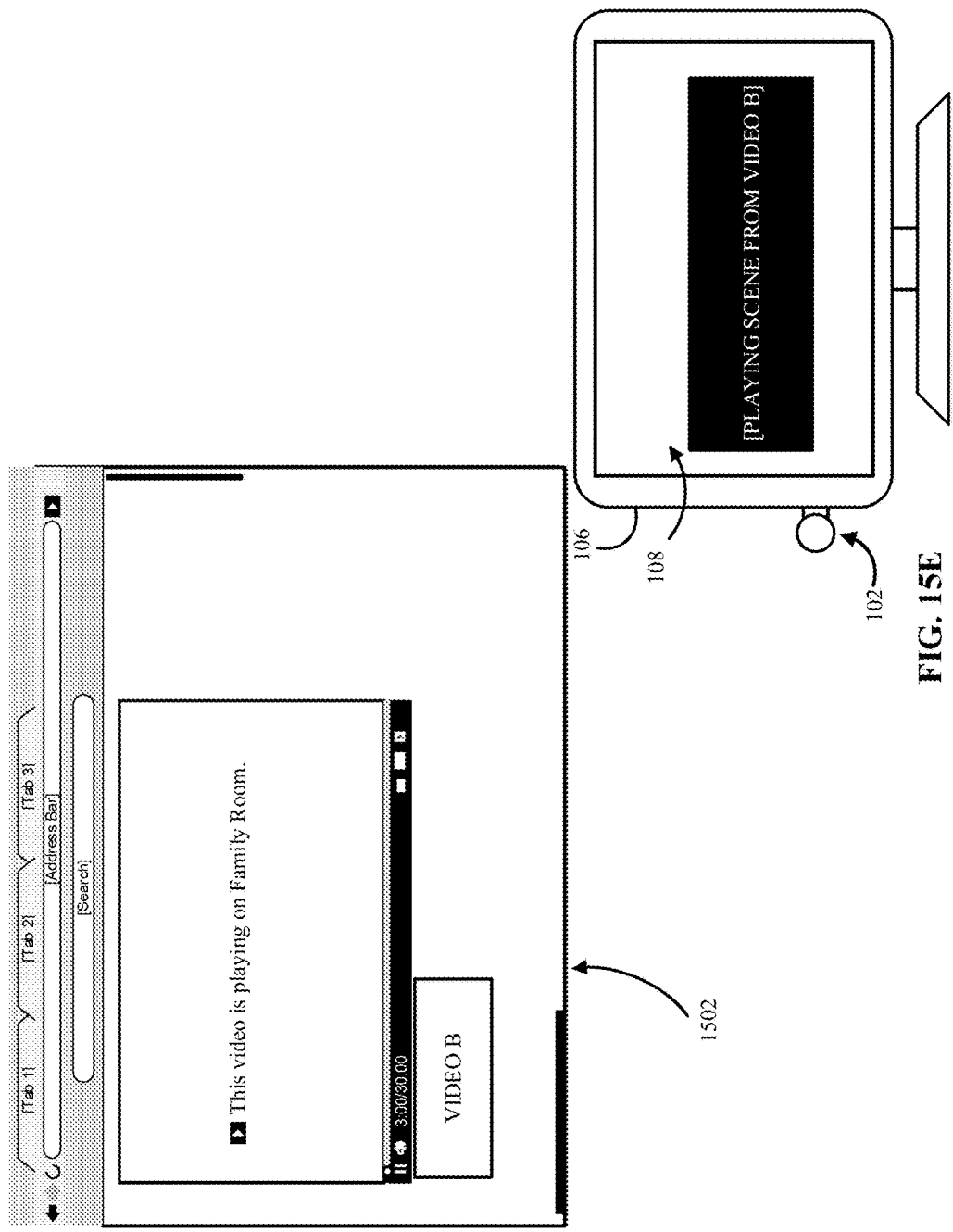

FIG. 15E shows an example in which the video that was being presented on browser 1502 is being presented in a full screen mode on display 108.

In some implementations, the mechanisms described herein, including the virtual operating system, the mobile operating system, the sender application, the receiver application, the content presentation application, the content streaming application and/or any other suitable mechanisms, can include server-side software, server-side hardware, client-side software, client-side hardware, or any suitable combination thereof. For example, the applications can encompass a computer program written in a programming language recognizable by hardware processor 312, hardware processor 322, and/or hardware processor 332 (e.g., a program written in a programming language, such as, Java, C, Objective-C, C++, C#, Javascript, Visual Basic, or any other suitable approaches). As another example, the applications can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 4-15E can be executed or performed in any order or sequence not limited to the order and sequence shown and described in the figures. Also, some of the above steps of the processes of FIGS. 4-15E can be executed or performed substantially simultaneously where appropriate or in parallel to reduce latency and processing times.

It should also be noted that, as used herein, the term mechanism can encompass hardware, software, firmware, or any suitable combination thereof.

Accordingly, systems, methods, and media for presenting a virtual operating system on a display device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting a virtual operating system user interface, comprising:
    detecting, using a hardware processor of a mobile device, one or more media receiving devices that are capable of presenting one or more virtual operating system user interfaces of the virtual operation system, wherein each of the one or more media receiving devices is operatively coupled to a display device;
    causing, using the hardware processor of the mobile device, a selectable notification to be presented on a display of the mobile device, wherein the selectable notification indicates that the one or more media receiving devices that are capable of presenting the one or more virtual operating system user interfaces of the virtual operating system have been detected;
    in response to receiving a selection of the selectable notification corresponding to a media receiving device of the one or more media receiving devices, receiving, using the hardware processor of the mobile device, one or more properties of the display device associated with the media receiving device in which the virtual operating system user interface is to be presented and selecting a plurality of applications to present in the virtual operating system user interface;
    generating, using the hardware processor of the mobile device, the virtual operating system user interface based on the one or more properties of the display device and based on application properties of the plurality of application, wherein the virtual operating system user interface includes user interface elements corresponding to at least one of the plurality of applications;
    transmitting, using the hardware processor of the mobile device, a media stream that includes the generated virtual operating system to the media receiving device to present the virtual operating system user interface on the display device;
    causing, using the hardware processor of the mobile device, a first user interface element corresponding to a first application of the plurality of applications to be highlighted in the virtual operating system user interface;
    receiving, using the hardware processor of the mobile device, one or more signals from a remote control device to select a second user interface element corresponding to a second application of the plurality of applications;
    executing, using the hardware processor of the mobile device, the second application to generate an application user interface for the second application to be presented by the display device, wherein the application user interface is formatted for presentation on the display device, wherein the second application is associated with a service that provides access to one or more media content items, and wherein the application user interface includes a plurality of user interface elements each corresponding to at least one of the one or more media content items; and
    transmitting, using the hardware processor of the mobile device, the application user interface for the second application to the media receiving device to present the application user interface for the second application on the display device.

2. The method of claim 1, further comprising:
receiving a signal from the remote control device to pause presentation of the selected media content item; and
causing the media receiving device to pause presentation of the selected media content item.

3. The method of claim 1, further comprising:
receiving a signal from the remote control device to go back to a previous screen during presentation of the selected media content item; and
causing the media receiving device to present the application user interface for the second application on the display device in response to receiving the signal to go back to a previous screen.

4. The method of claim 1, further comprising:
receiving a signal from the remote control device to present a home screen during presentation of the selected media content item; and
causing the media receiving device to present the virtual operating system user interface in response to receiving the signal to go to the home screen.

5. The method of claim 1, wherein causing the media receiving device to present the application user interface for the second application on the display device is performed with the mobile device in a display inhibited state.

6. The method of claim 1, wherein at least a portion of the plurality of applications are selected from application installed on the mobile device.

7. A system for presenting a virtual operating system user interface, comprising:
    a mobile device comprising a hardware processor that is programmed to:
        detect one or more media receiving devices that are capable of presenting one or more virtual operating system user interfaces of the virtual operation system, wherein each of the one or more media receiving devices is operatively coupled to a display device;

cause a selectable notification to be presented on a display of the mobile device, wherein the selectable notification indicates that the one or more media receiving devices that are capable of presenting the one or more virtual operating system user interfaces of the virtual operating system have been detected;

in response to receiving a selection of the selectable notification corresponding to a media receiving device of the one or more media receiving devices, receive one or more properties of the display device associated with the media receiving device in which the virtual operating system user interface is to be presented and select a plurality of applications to present in the virtual operating system user interface;

generate the virtual operating system user interface based on the one or more properties of the display device and based on application properties of the plurality of application, wherein the virtual operating system user interface includes user interface elements corresponding to at least one of the plurality of applications;

transmit a media stream that includes the generated virtual operating system to the media receiving device to present the virtual operating system user interface on the display device;

cause a first user interface element corresponding to a first application of the plurality of applications to be highlighted in the virtual operating system user interface;

receive one or more signals from a remote control device to select a second user interface element corresponding to a second application of the plurality of applications;

execute the second application to generate an application user interface for the second application to be presented by the display device, wherein the application user interface is formatted for presentation on the display device, wherein the second application is associated with a service that provides access to one or more media content items, and wherein the application user interface includes a plurality of user interface elements each corresponding to at least one of the one or more media content items;

transmit the application user interface for the second application to the media receiving device to present the application user interface for the second application on the display device.

8. The system of claim 7, wherein the hardware processor is also programmed to:
receive a signal from the remote control device to pause presentation of the selected media content item; and
cause the media receiving device to pause presentation of the selected media content item.

9. The system of claim 7, wherein the hardware processor is also programmed to:
receive a signal from the remote control device to go back to a previous screen during presentation of the selected media content item; and
cause the media receiving device to present the application user interface for the second application on the display device in response to receiving the signal to go back to a previous screen.

10. The system of claim 7, wherein the hardware processor is also programmed to:
receive a signal from the remote control device to present a home screen during presentation of the selected media content item; and cause the media receiving device to present the virtual operating system user interface in response to receiving the signal to go to the home screen.

11. The system of claim 7, wherein the hardware processor is also programmed to cause the media receiving device to present the application user interface for the second application on the display device while the mobile device is in a display inhibited state.

12. The system of claim 7, wherein at least a portion of the plurality of applications are selected from application installed on the mobile device.

13. A non-transitory computer-readable medium containing computer executable instructions that, when executed by a processor, cause the processor to perform a method for presenting a virtual operating system user interface, the method comprising:

detecting, at a mobile device, one or more media receiving devices that are capable of presenting one or more virtual operating system user interfaces of the virtual operation system, wherein each of the one or more media receiving devices is operatively coupled to a display device;

causing, by the mobile device, a selectable notification to be presented on a display of the mobile device, wherein the selectable notification indicates that the one or more media receiving devices that are capable of presenting the one or more virtual operating system user interfaces of the virtual operating system have been detected;

in response to receiving a selection of the selectable notification corresponding to a media receiving device of the one or more media receiving devices, receiving, by the mobile device, one or more properties of the display device associated with the media receiving device in which the virtual operating system user interface is to be presented and selecting a plurality of applications to present in the virtual operating system user interface;

generating, by the mobile device, the virtual operating system user interface based on the one or more properties of the display device and based on application properties of the plurality of application, wherein the virtual operating system user interface includes user interface elements corresponding to at least one of the plurality of applications;

transmitting, by the mobile device, a media stream that includes the generated virtual operating system to the media receiving device to present the virtual operating system user interface on the display device;

causing, by the mobile device, a first user interface element corresponding to a first application of the plurality of applications to be highlighted in the virtual operating system user interface;

receiving, by the mobile device, one or more signals from a remote control device to select a second user interface element corresponding to a second application of the plurality of applications;

executing, by the mobile device, the second application to generate an application user interface for the second application to be presented by the display device, wherein the application user interface is formatted for presentation on the display device, wherein the second application is associated with a service that provides access to one or more media content items, and wherein the application user interface includes a plurality of user interface elements each corresponding to at least one of the one or more media content items; and transmitting, by the mobile device, the application user interface for the second application to the media receiving device to present the application user interface for the second application on the display device.

14. The non-transitory computer-readable medium of claim 13, wherein the method further comprises:
receiving a signal from the remote control device to pause presentation of the selected media content item; and
causing the media receiving device to pause presentation of the selected media content item.

15. The non-transitory computer-readable medium of claim 13, wherein the method further comprises:
receiving a signal from the remote control device to go back to a previous screen during presentation of the selected media content item; and
causing the media receiving device to present the application user interface for the second application on the display device in response to receiving the signal to go back to a previous screen.

16. The non-transitory computer-readable medium of claim 13, wherein the method further comprises:
receiving a signal from the remote control device to present a home screen during presentation of the selected media content item; and
causing the media receiving device to present the virtual operating system user interface in response to receiving the signal to go to the home screen.

17. The non-transitory computer-readable medium of claim 13, wherein causing the media receiving device to present the application user interface for the second application on the display device is performed with the mobile device in a display inhibited state.

18. The non-transitory computer-readable medium of claim 13, wherein at least a portion of the plurality of applications are selected from application installed on the mobile device.

* * * * *